(12) United States Patent
Loretz et al.

(10) Patent No.: US 12,215,654 B2
(45) Date of Patent: Feb. 4, 2025

(54) CASCADE ELEMENT FOR A THRUST REVERSER SYSTEM OF AN ENGINE

(71) Applicant: FACC AG, Ried im Innkreis (AT)

(72) Inventors: Ludwig Loretz, Stockerau (AT); Andreas Hoellrigl, Vienna (AT); Guenter Nelboeck, Seewalchen (AT)

(73) Assignee: FACC AG, Ried im Innkreis (AT)

( * ) Notice: Subject to any disclaimer, the term of this patent is extended or adjusted under 35 U.S.C. 154(b) by 0 days.

(21) Appl. No.: 18/005,344

(22) PCT Filed: Jul. 13, 2021

(86) PCT No.: PCT/AT2021/060248
§ 371 (c)(1),
(2) Date: Jan. 12, 2023

(87) PCT Pub. No.: WO2022/011407
PCT Pub. Date: Jan. 20, 2022

(65) Prior Publication Data
US 2023/0265811 A1    Aug. 24, 2023

(30) Foreign Application Priority Data

Jul. 13, 2020    (AT) .............................. A 50605/2020

(51) Int. Cl.
*F02K 1/72*        (2006.01)
*F02K 1/76*        (2006.01)
(Continued)

(52) U.S. Cl.
CPC ................ *F02K 1/72* (2013.01); *F02K 1/766* (2013.01); *B33Y 10/00* (2014.12); *B33Y 80/00* (2014.12);
(Continued)

(58) Field of Classification Search
CPC ........... B33Y 10/00; B33Y 80/00; F02K 1/72; F02K 1/766; F05D 2220/323; F05D 2230/30
See application file for complete search history.

(56) References Cited

U.S. PATENT DOCUMENTS 4,722,821 A    2/1988 Vermilye
5,507,143 A *  4/1996 Luttgeharm ............ F02K 1/605
                                                239/265.31
(Continued)

FOREIGN PATENT DOCUMENTS

EP    2949910 A1    12/2015
EP    3584434 A1    12/2019
(Continued)

OTHER PUBLICATIONS

Dai, W., Alkahtani, M., Hemmer, P. R et al. "Drag-reduction of 3D printed shark-skin-like surfaces", Friction 7, pp. 603-612, (2019) (Year: 2019).*

(Continued)

*Primary Examiner* — Lorne E Meade
(74) *Attorney, Agent, or Firm* — McCoy Russell LLP

(57) ABSTRACT

A cascade element for a thrust reverser system of an engine, more particularly a jet engine, comprises a number of mutually adjacent deflecting vanes for deflecting an air flow, at least one of the deflecting vanes being twisted about its longitudinal axis at least along a twist longitudinal portion, and an engine having a cascade element of this type and to a method for producing a cascade element of this type, wherein additive manufacturing is carried out.

17 Claims, 17 Drawing Sheets

(51) Int. Cl.
  *B33Y 10/00* (2015.01)
  *B33Y 80/00* (2015.01)
(52) U.S. Cl.
  CPC .... *F05D 2220/323* (2013.01); *F05D 2230/30* (2013.01)

(56) References Cited

U.S. PATENT DOCUMENTS

| | | | |
|---|---|---|---|
| 10,113,507 B2* | 10/2018 | Starovic | F02K 1/72 |
| 10,598,127 B2* | 3/2020 | Wadsworth | F02K 1/54 |
| 10,823,112 B2* | 11/2020 | Harpal | F02K 1/72 |
| 10,830,176 B2* | 11/2020 | Soria | B33Y 80/00 |
| 2017/0057166 A1* | 3/2017 | Soria | B29C 64/118 |
| 2018/0340492 A1* | 11/2018 | Harpal | F02K 1/72 |

FOREIGN PATENT DOCUMENTS

| | | |
|---|---|---|
| EP | 3597543 A2 | 1/2020 |
| RU | 2492338 C2 | 9/2013 |
| RU | 2650982 C2 | 4/2018 |
| RU | 2697776 C2 | 8/2019 |

OTHER PUBLICATIONS

ISA European Patent Office, International Search Report Issued in Application No. PCT/AT2021/060248, Nov. 2, 2021, WIPO, 4 pages.

\* cited by examiner

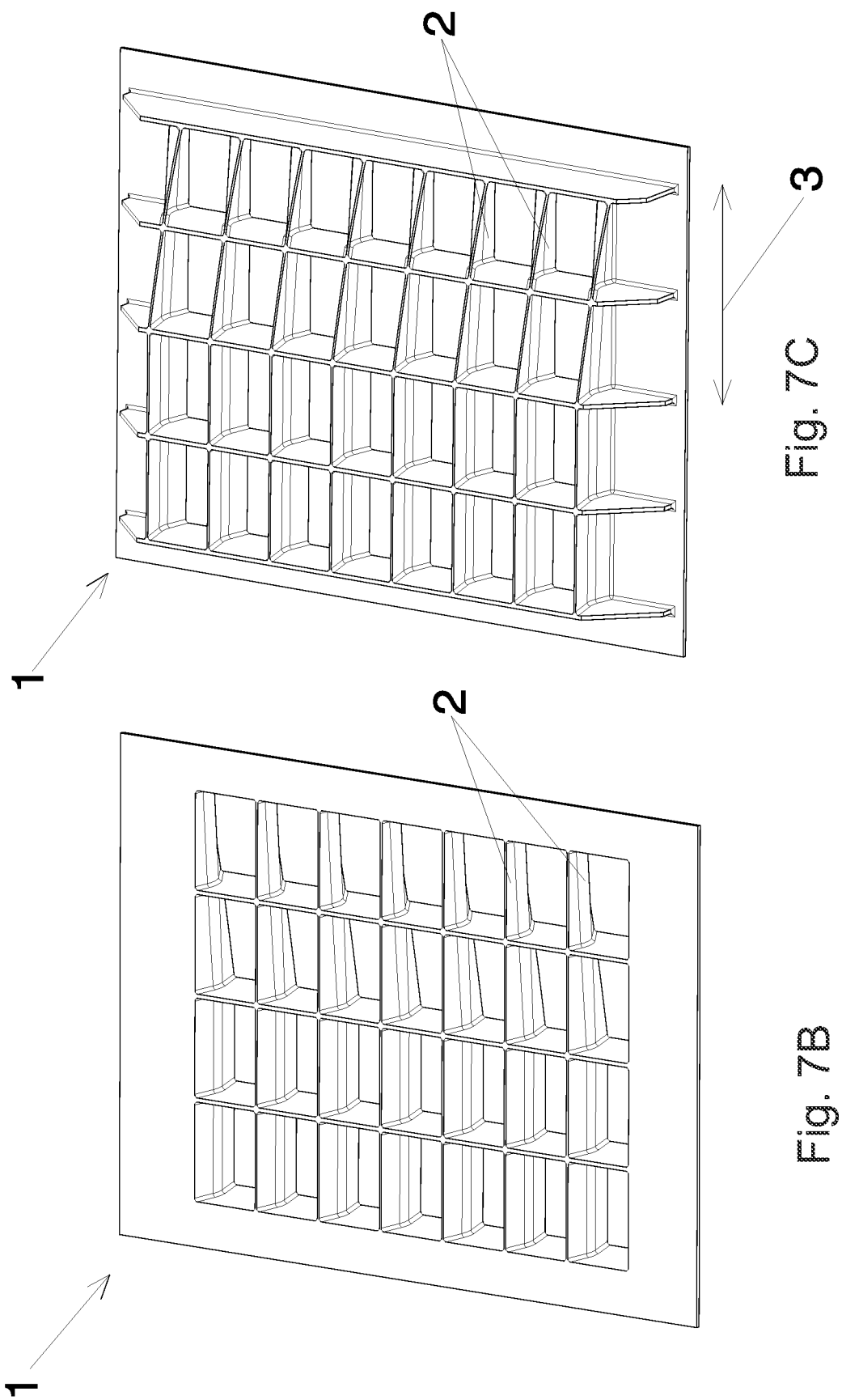

CASCADE ELEMENT FOR A THRUST REVERSER SYSTEM OF AN ENGINE

CROSS REFERENCE TO RELATED APPLICATIONS

The present application is a U.S. National Phase of International Application No. PCT/AT2021/060248 entitled "CASCADE ELEMENT FOR A THRUST REVERSER SYSTEM OF AN ENGINE," and filed on Jul. 13, 2021. International Application No. PCT/AT2021/060248 claims priority to Austrian Patent Application No. A 50605/2020 filed on Jul. 13, 2020. The entire contents of each of the above-listed applications are hereby incorporated by reference for all purposes.

TECHNICAL FIELD

The invention relates to a cascade element for a thrust reverser system of an engine, particularly a jet engine, comprising a number of adjacently arranged deflecting blades for deflecting an airflow. Furthermore, the invention relates to an engine having a thrust reverser system. Finally, the invention relates to a method for producing a cascade element for a thrust reverser system of an engine, particularly a jet engine.

BACKGROUND AND SUMMARY

An engine with a thrust reverser system is for example known from US 2017/0057166 A1.

Using thrust reverser systems, the airflow of an engine can be deflected counter to the direction of thrust for the forwards movement of the aircraft, in order to brake the aircraft effectively after touchdown on the landing runway. As a result, the landing roll distance is shortened and loading of the wheel brakes is reduced during the landing of aircraft.

The engine equipped with the thrust reverser system may be a turbojet or a turbofan. To activate the thrust reversal, a thrust reverser flap is usually introduced into the driving airflow (for example into the bypass/secondary flow in the case of a turbofan). Using this thrust reverser flap, the usual path of the driving airflow is at least partially closed and the airflow is deflected by for example approximately 90°, so that the airflow subsequently runs substantially radially with respect to the longitudinal axis of the engine. Due to the displacement of the thrust reverser flap, a number of cascade elements, which run substantially circumferentially and form a ring, can be exposed simultaneously. These cascade elements in each case comprise a cascade of adjacently arranged deflecting blades, using which the direction of the airflow is deflected further. In this manner, the airflow can obtain a component in the forward axial direction (i.e. in the direction opposite to the outlet airflow for flight operations). Using the cascade elements, the effective surface area loss is also minimized and the reverse thrust is maximized.

An engine may for example comprise 32 cascade elements. Each cascade element must be manufactured individually, which is why high manufacturing equipment costs arise. In the prior art, the cascade elements are milled from metal or manually faced. Furthermore, manufacturing in an injection moulding method or using die forging is possible. In the case of production using autoclave moulding, a carbon fibre structure is introduced into a mould. Flexible mandrels, which define open deflection channels of the deflecting blades, reach into the carbon fibre structure. The insertion usually takes place by hand and is very labour-intensive. Depending on the design, the mould can be closed and an upper and a lower part of the mould moved towards one another, in order to exert a consolidation pressure on the fibre structure, or the fibre structure is enclosed in the mould in a vacuumized manner and hardened under pressure in an autoclave. The flexible mandrels must be removed after moulding. This process is in turn very expensive and difficult.

In known thrust reverser systems, the problem occurs that the deflected thrust stream can be blown in the direction of the inlet region of the engine. As a result, foreign objects on the landing runway can be whirled up and sucked in by the engine. This may lead to damage to the engine. In order to minimize these disadvantages, cascade elements with inclined deflecting blades can be provided in known thrust reverser systems at certain sections on the lateral surface of the engine, the longitudinal axes of which deflecting blades enclose an angle different from 90° to a longitudinal axis of the engine, in order to divert the reverse airflow away from the ground and/or from the wings. Only a very imprecise deflection of the reverse airflow is possible, therewith however, as the deflecting blades of a cascade element in the prior art have the same inclined position everywhere. Such a design could increase the turbulence further. The reverse thrust power could also be reduced.

The object of the present invention consists in alleviating or overcoming at least individual disadvantages of the prior art. The invention aims in particular to propose a cascade element and an engine having a thrust reverser system, using which the reverse thrust power should be increased and/or a more precise deflection of the reverse airflow should be enabled. Furthermore, it is in particular an object of the present invention to provide a simple production method for such a cascade element.

This object is achieved by a cascade element with the features of claim 1, an engine with the features of claim 10 and a method with the features of claim 12. Preferred embodiments are specified in the dependent claims.

According to the invention, at least one of the deflecting blades of the cascade element is twisted about its longitudinal axis at least along a twisting longitudinal section.

Due to the twisting of the deflecting blade at a longitudinal section of the deflecting blade, it is possible to deflect the airflow more precisely and in particular to deflect the air differently along the longitudinal extent of the deflecting blade. Furthermore, it is advantageously possible due to the twisting to bundle the airflow of adjacent cascade elements or a cascade element. In the case of use in a thrust reverser system of an aircraft engine, the air can be deflected effectively from the ground and/or the wings.

At least two longitudinal lines are present on the twisting longitudinal section of this deflecting blade, which longitudinal lines are skew to one another (i.e. not parallel shifted). In this case, the first of the longitudinal lines runs through two first points and the second of the longitudinal lines runs through two second points, wherein the two second points are respectively shifted by the same vector with respect to respectively one of the two first points (preferably in the direction of downward extent of the deflecting blade). For this definition, the wall thickness (thickness) of the deflecting blade is disregarded and the points are in particular determined for half wall thickness in each case. Furthermore, for the condition of parallelism a (usually low) curvature to adapt to the circumference of an engine nacelle, i.e. a curvature around the spacing direction, is not taken into account. The deflecting blades extend in the longitudinal direction substantially normal to a spacing direction of the deflecting blades with respect to one another. The twisting angle preferably lies between 0° and 50°, particularly preferably between 2° and 30°, even more preferably between 3° and 20. The twisting angle is defined by means of two outermost (i.e. furthest away in the direction of downward extent, particularly top (uppermost) and bottom (lowermost)) longitudinal lines, as defined above.

The twisting is preferably continuous over a section. The deflecting blade can comprise two or more different twists in various longitudinal sections. Preferably, more than one deflecting blade of the cascade element comprises the twist, particularly preferably all deflecting blades of the cascade element comprise one twist in each case, particularly in the same twisting direction.

The cascade element comprises the number of adjacently arranged deflecting blades preferably in the form of vanes. The cascade element preferably comprises between 5 and 200, particularly preferably between 30 and 60 deflecting blades. The deflecting blades preferably comprise a larger longitudinal extent than downward extent in each case. The longitudinal axis essentially runs in the direction of longitudinal extent of the deflecting blades. The direction of longitudinal extent is defined by an average direction of longitudinal extent. The downward extent of the deflecting blades is preferably at least 1 cm, particularly between 2 and 15 cm, particularly preferably between 3 and 12 cm, even more preferably between 5 and 8 cm. The longitudinal extent of the deflecting blades is preferably at least 2 cm, particularly between 3 and 20 cm, particularly preferably between 4 and 15 cm, even more preferably between 6 and 10 cm. The wall thickness of the deflecting blades is preferably between 0.5 and 15 mm, preferably between 1 and 7 mm, particularly preferably between 1.5 and 6 mm, even more preferably between 2 and 5 mm. Preferably, a plurality or all of the deflecting blades of a cascade element comprise the same twist or at least a twist in the same direction (but possibly at different angles).

The engine according to the invention comprises at least one cascade element according to the invention. Advantageously, the engine comprises a plurality of cascade elements according to the invention. The engine can comprise at least one cascade element according to the invention and at least one conventional cascade element (i.e. without twisting of the deflecting blades).

In the intended placement of the cascade element in the thrust reverser system of an engine, the longitudinal extent and/or longitudinal axis of the cascade element in particular runs in the circumferential direction with respect to the longitudinal axis of the engine, i.e. the engine axis. The spacing direction of the cascade elements in particular runs substantially in the axial direction of the engine or the engine nacelle.

The method according to the invention for producing a cascade element for a thrust reverser system of an engine, particularly a jet engine, at least comprises the step:

additive production of a number of adjacently arranged deflecting blades for deflecting an airflow, wherein at least one of the deflecting blades is constructed with a twist with respect to its longitudinal axis along a longitudinal section.

Using this method, the above-described cascade element can be produced in a particularly simple manner. The additive production is preferably carried out by means of 3D printing. Preferably, (at least one) fibre-reinforced plastic, particularly thermoplastic or thermosetting plastic, preferably GFRP or CFRP, or (at least one) metal is used as material for additive production.

With reference to the cascade element according to the invention, it is advantageous if the adjacently arranged deflecting blades are connected to one another by at least two supporting walls, wherein in each case, two adjacent deflecting blades and two supporting walls form a fluid flow deflection channel. Preferably, at least 2 supporting walls are provided. In a preferred design, between 1 and 30 supporting walls, particularly preferably between 3 and 6 supporting walls, are provided. Thus, a multiplicity of fluid flow deflection channels are formed. The supporting walls can increase the stability of the cascade element and also improve the deflection of the airflow. The supporting walls extend substantially parallel to the spacing direction of the deflecting blades from one another, i.e. the direction of longitudinal extent of the deflecting blades is approximately or substantially normal to the direction of longitudinal extent of the supporting walls. The supporting walls are preferably flat and/or planar. It is particularly advantageous if the supporting walls are also used for flow conduction. In order to achieve this, at least one supporting wall can comprise a direction of longitudinal extent which deviates from the spacing direction or the axial direction of an engine and in particular encloses an angle of at least 2°, preferably at least 5°, with the spacing direction or the axial direction of the engine. Furthermore, it is preferred if at least one supporting wall is twisted about its longitudinal axis at least along a twisting longitudinal section. The same preferred features may be present for the twisting of the supporting wall as for the twisting of the deflecting blade. Preferably, the spacing between two adjacent supporting walls of a cascade element is more than 1-times the size, preferably 1.5-times the size, particularly preferably more than twice the size, of the spacing between two adjacent deflecting blades. With respect to the intended placement of the cascade element in the thrust reverser system of an engine, the supporting walls preferably extend along the direction of longitudinal extent, i.e. in the axial direction, of the engine.

It is advantageous if the deflecting blades are curved with respect to an axis which is defined by a spacing direction of the number of deflecting blades from one another (or the longitudinal axis of the engine nacelle) to adapt to a lateral surface of an engine nacelle. Therefore, a number of cascade elements can be provided running circumferentially in the thrust reverser system of the engine. The radius of curvature with respect to an axis parallel to the spacing direction is preferably between 0.5 and 2.5 m, particularly preferably between 0.6 and 2 m, even more preferably between 0.75 and 1.75 m. The spacing direction of the number of deflecting blades from one another preferably corresponds in particular to the direction of longitudinal extent or axial direction of the engine or the direction of longitudinal extent of the supporting walls.

In a preferred embodiment, at least one deflecting blade comprises a curved cross section, particularly in the cross section normal to the direction of longitudinal extent and direction of downward extent of the deflecting blade (i.e. normal to the surface of the deflecting blade). As a result, an airflow can be deflected further and the airflow can in particular be provided with a speed component in the opposite direction to an airflow flowing into the engine. Preferably, all of the number of deflecting blades of a cascade element comprise a curved cross section. The curvature of the cross section comprises a radius of curvature of preferably at least 1 cm, particularly preferably at least 2 cm, even more preferably between 3 and 15 cm, even more preferably between 5 and 10 cm.

It is preferred if at least one deflecting blade comprises a bulge on an edge delimiting the deflecting blade in the direction of downward extent (i.e. at an outer edge as viewed in the radial direction of the engine), so that the shape of the edge deviates from a straight line or, in the twisting longitudinal section, from a helix.

This design can be provided in a cascade element as described above, but also in a cascade element without twisting of the deflecting blades. Accordingly, the invention also relates in general terms to a cascade element for a thrust reverser system of an engine, particularly a jet engine, comprising a number of adjacently arranged deflecting blades for deflecting an airflow, wherein at least one deflecting blade comprises a bulge on an edge delimiting the deflecting blade in the direction of downward extent (i.e. at an outer edge as viewed in the radial direction of the engine).

The edges of the deflecting blades on one side preferably lie substantially in one plane. In the region of the bulge, the deflecting blade protrudes beyond the plane defined by the edges of the deflecting blades (into the remaining region without a bulge). The bulge can be designed to be symmetrical or asymmetrical with respect to an axis extending in the direction of downward extent of the deflecting blade. Using the bulge, the airflow can be bundled and its direction changed, whilst the deflecting blade may otherwise comprise a smaller direction of downward extent. The shape of the bulge can be configured to be variable in all directions.

In a preferred embodiment, the at least one deflecting blade is designed to be concave in the region of the bulge (as viewed from the direction of the thrust airflow prior to the deflection of the same by the deflecting blades), particularly as a partial shell. As a result, an airflow can be bundled particularly well and deflected at the same time.

It is advantageous if the deflecting blade is designed in such a manner that a fluid flow flowing past the deflecting blade is deflected in the direction of a central line of the bulge. As a result, the effect of the thrust reversal can be improved.

In an advantageous embodiment, at least one guiding rib is provided on at least one deflecting blade (on at least one of the two sides or surfaces of the deflecting blade).

This design can be provided in a cascade element as described above, but also in a cascade element without twisting of the deflecting blades. Accordingly, the invention also relates in general terms to a cascade element for a thrust reverser system of an engine, particularly a jet engine, comprising a number of adjacently arranged deflecting blades for deflecting an airflow, wherein at least one guiding rib is provided on at least one deflecting blade.

The guiding rib preferably runs at an angle between −45° and +45°, preferably between −30° and +30°, to the direction of downward extent of the deflecting blades, particularly in the direction of downward extent of the deflecting blade. The guiding rib in particular forms a bulge of the surface of the deflecting blades. Advantageously, one guiding rib runs the same way (congruently) on both sides of the deflecting blade. Preferably, at least one deflecting blade comprises more than one guiding rib. A more aerodynamically beneficial deflection of the airflow can be achieved using the guiding ribs. Furthermore, the guiding rib can also be used to stiffen the deflecting blade and thus improve the stability.

It is preferred if at least one deflecting blade comprises a wall thickness which changes in the direction of downward extent. Preferably, the wall thickness decreases (monotonically) in an orientation of the direction of downward extent, particularly in the direction of an airflow discharge direction of a thrust reverser system, or the wall thickness decreases starting from a (particularly central) longitudinal line in both orientations of the direction of downward extent. That is to say, the deflecting blade can for example comprise a larger wall thickness in the centre with respect to the downward extent than at the edge. The aerodynamics of a deflected airflow can be improved as a result. Furthermore, the stability at the same weight can be improved and the costs can be reduced. It is also possible to achieve noise reduction.

With reference to the engine according to the invention, it is advantageous if two cascade elements are provided, which are arranged in a substantially mirror-inverted manner, so that the airflow deflected by both cascade elements can be merged or bundled. It is therefore advantageous, if the thrust reverser system comprises at least one first and one second cascade element as described herein (wherein the first and the second cascade element in the circumferential direction with respect to an engine axis are preferably arranged adjacently), wherein at least one of the deflecting blades of the first cascade element is twisted in a first angular direction about a longitudinal axis of the same deflecting blade at least along the twisting longitudinal section and at least one of the deflecting blades of the second cascade element is twisted in a second angular direction, which is opposite to the first angular direction, about a longitudinal axis of the same deflecting blade at least along the twisting longitudinal section. Therefore, at least one deflecting blade of the two cascade elements in each case comprises an opposite twist. The longitudinal axes of the twist of the two cascade elements are preferably substantially symmetrical with respect to a plane running through a central axis of the engine.

With respect to the method according to the invention, it is advantageous if the step of additive production of the number of adjacently arranged deflecting blades further comprises the provision of a riblet surface (shark scale surface) on at least one side surface section of at least one of the deflecting blades. As a result, the flow guidance can be improved and the flow resistance can be reduced. Noise reduction can also be achieved. This means in particular that on the side surface section, a multiplicity of ribs is provided, the longitudinal axis of which lies in the direction of flow in particular and which in particular comprise a triangular shape. The same run in the direction of flow of an airflow to be deflected. Preferably at least 20, particularly preferably at least 50, even more preferably at least 200 ribs are provided. The ribs in particular comprise a pointed terminal edge; the point preferably comprises an acute angle of preferably less than 60°, particularly preferably less than 50°, even more preferably less than 40°. Preferably, the spacing between the points of two adjacent ribs is less than 1 mm, particularly preferably less than 0.2 mm, even more preferably less than 0.1 mm. It is particularly preferred if the riblet surface is applied in an additional manufacturing step, particularly in the form of a film or a coating.

During the additive production, a filament is preferably used, which comprises a thermoset plastic and/or a thermoplastic. Fabric reinforcement preferably takes place using an endless carbon fibre and/or endless glass fibre. Preferably, a cascade element is produced in one of the embodiments as described herein. The deflecting blades could also be produced additively from a metallic base material.

In an advantageous variant, the method further comprises the step: additive production of at least two supporting walls, using which, adjacently arranged deflecting blades are connected to one another, wherein in each case two adjacent deflecting blades and two supporting walls form a fluid flow deflection channel. As a result, the stability and the air deflection can be improved.

It is advantageous, if the additive production of the number of adjacently arranged deflecting blades and the additive production of at least two supporting walls takes place using at least one first and one second print head, wherein at least one supporting wall and one deflecting blade, which delimit a certain fluid flow deflection channel, are produced using the first print head, and at least one further supporting wall and one further deflecting blade, which delimit the certain fluid flow deflection channel, are produced using the second print head, wherein fibres used for additive production from the first print head and from the second print head are guided in an interwoven criss-cross manner at least at one corner of the certain fluid flow deflection channel. Advantageously, in a first pass, one layer in each case is applied by the first and by the second print head. In at least one second pass, in each case one further layer is applied (particularly according to a new pattern), so that at least one, preferably each, deflecting blade and at least one, preferably each, supporting wall contains layers from the first and from the second print head. As a result, the stability and the uniformity of the cascade element can be improved. By means of the first and the second print head, the filament (for example thermoplastic/thermoset plastic, particularly as a matrix) is supplied together with an endless fibre. The print heads preferably rotate once about their common axis, in order to effect the interwoven criss-crossing.

It is advantageous if the supporting wall, the deflecting blade, the further supporting wall and the further deflecting blade, which delimit the certain fluid flow deflection channel, in each case comprise two layers, wherein the production of one of the two layers takes place using the first print head and the production of the other of the two layers takes place using the second print head.

Preferably, a frame is produced first (for example by means of thermoplastic AFP), and subsequently the additive manufacturing of the deflecting blades takes place. Also, a frame can be pressed using a thermoplastic, and the deflecting blades are printed directly onto the frame. During the additive production, there is also the possibility of integrating specific sensor technology. Data can be obtained therewith (for example about loads or possible optimizations), furthermore, monitoring of the structural health can take place.

The invention is suitable in particular for thrust reverser systems of aircraft engines. Of course, it can also be used for other engines.

BRIEF DESCRIPTION OF THE FIGURES

The invention is explained in more detail in the following on the basis of preferred embodiments which are shown in the figures.

FIG. 7B shows the same cascade element as FIG. 7A in an isometric view from inside.

FIG. 7C shows the same cascade element as FIG. 7A in an isometric view from outside.

DETAILED DESCRIPTION

Figure 1:
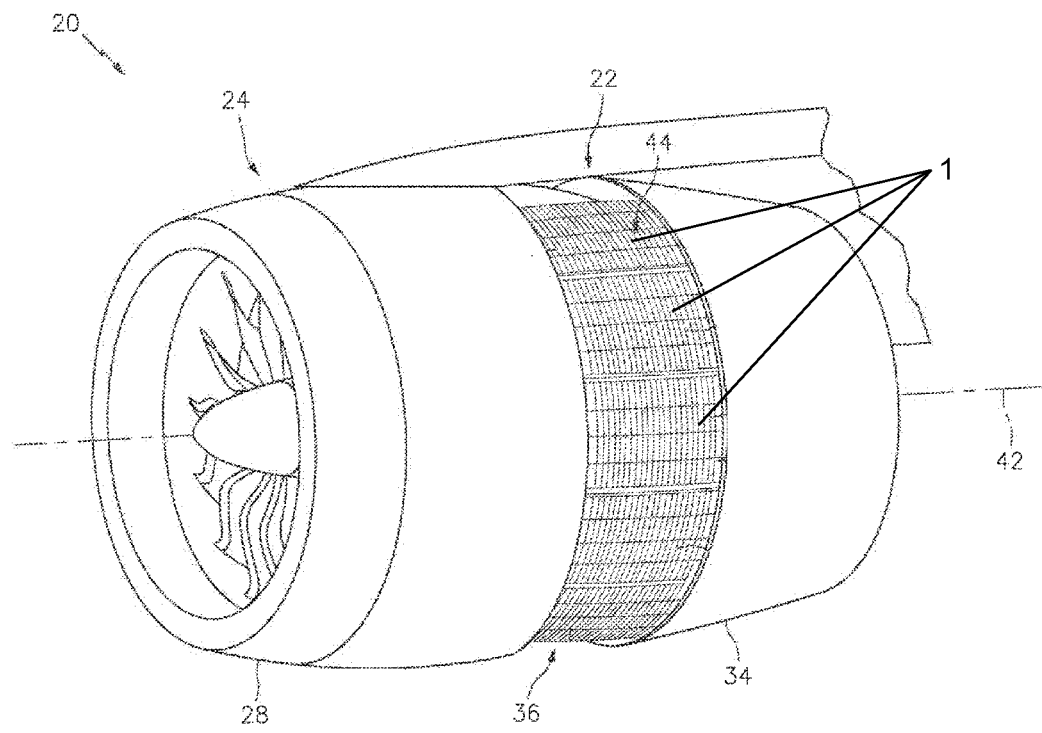
FIG. 1 shows an engine with a thrust reverser system with a number of cascade elements.
Figure 4:
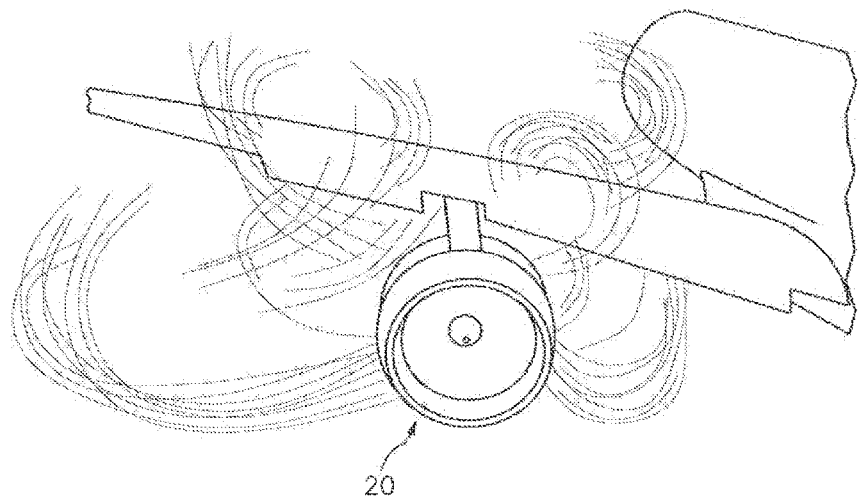
FIG. 4 shows the engine of FIG. 1 on a wing, wherein the deflected and directed airflow with activated thrust reversal is indicated after the discharge from the cascade elements.
Figure 2:
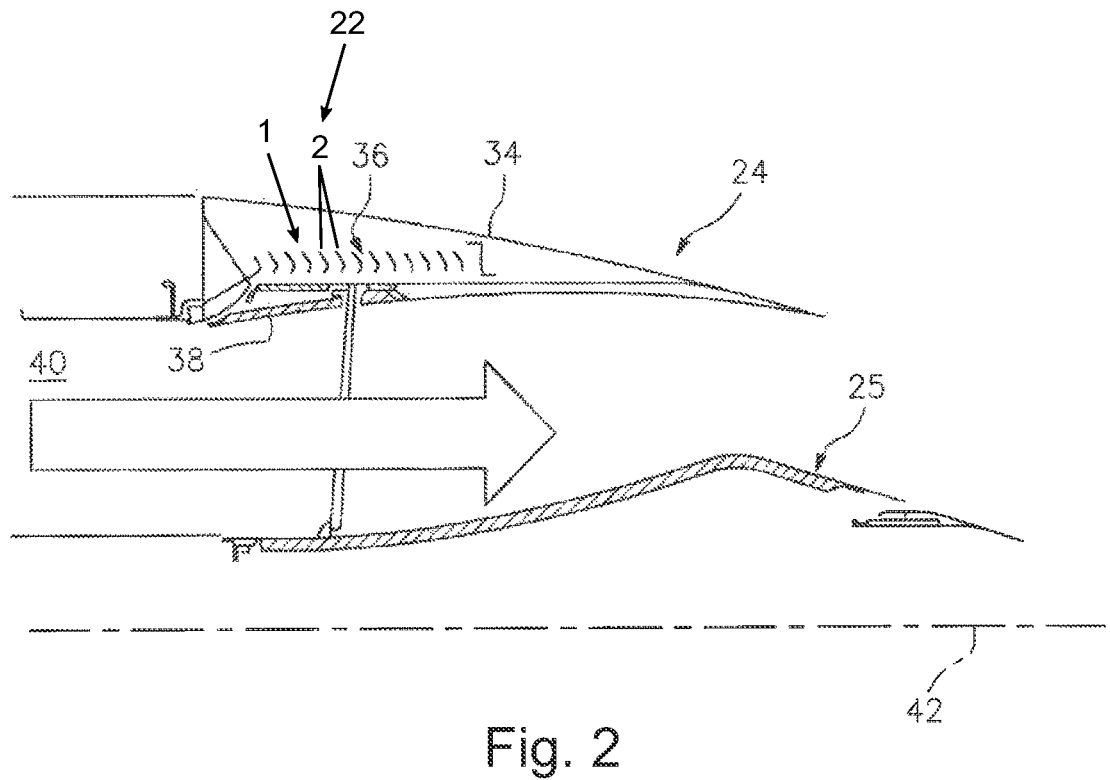
FIG. 2 shows the engine of FIG. 1 with the thrust reverser system in the deactivated state in cross section.
Figure 3:
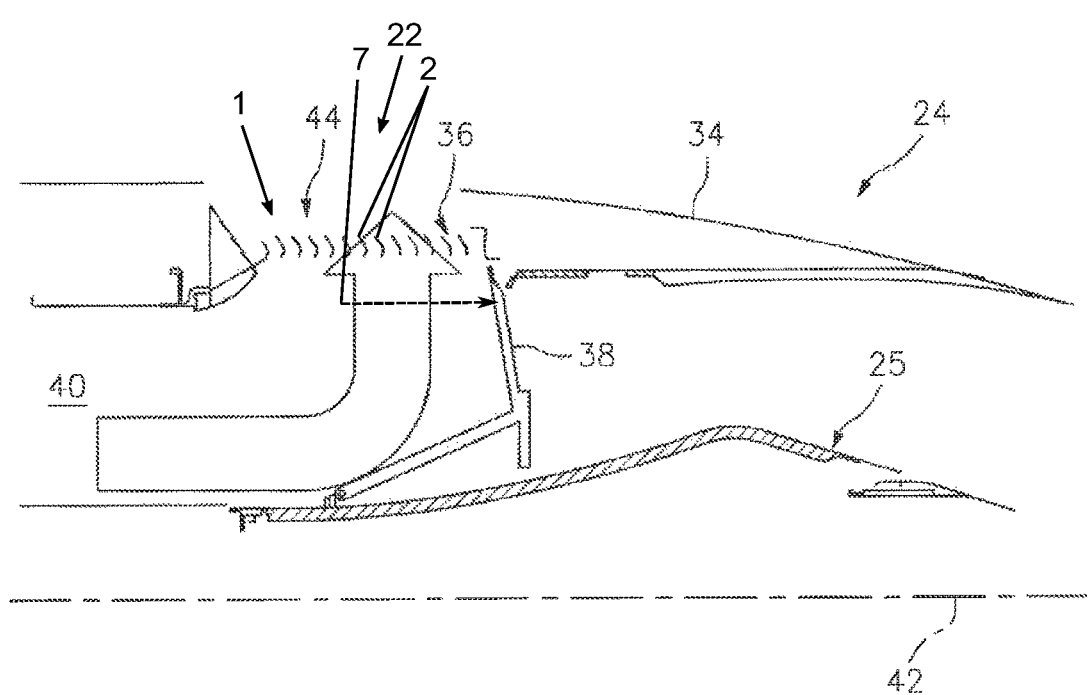
FIG. 3 shows the engine of FIG. 1 with the thrust reverser system in the activated state in cross section.

FIGS. 1 to 4 show an engine 20 having a thrust reverser system 22 (cf. U.S. 2017/0057166 A1). The engine comprises an outer engine nacelle structure 24 and an inner engine nacelle structure 25 (cf. FIGS. 2 and 3). The engine 20 comprises an air inlet 28 at its front end. The thrust reverser system 22 comprises a moving sleeve 34 and a cascade arrangement 36 which comprises a number of cascade elements 1. The thrust reverser system 22 also comprises one or more blocking flaps 38, which are set up to direct air from the thrust flow path 40 (particularly the engine jet or, in the case of a turbofan, the secondary/bypass flow) of the engine 20 to the cascade arrangement 36 during the use of thrust reversal or to block the thrust flow path 40 (cf. FIGS. 2 and 3).

The moving sleeve 34 can be moved along a direction of longitudinal extent or axial direction 42 of the engine 20 (drawn in as a centre line of the engine 20), in order to expose the cascade arrangement 36 and to open a thrust reversal flow path 44. When the thrust reverser system is activated, the airflow is diverted by the blocking flap 38 from the thrust flow path 40 to the thrust reversal flow path 44 and subsequently deflected further by the cascade elements 1. In particular, the airflow is diverted into a radially outward and axially forward direction. As is explained further below, a diversion of the airflow in the circumferential direction can also take place using the cascade elements 1, in order for example to deflect the air away from a landing runway and/or wings (cf. FIG. 4). When the thrust reverser system 22 is deactivated, the moving sleeve 34 is moved forwards along the axial direction 42 again, in order to cover the cascade arrangement 36 and to close the thrust reversal flow path 44. The cascade elements 1 are arranged substantially circumferentially around the axial centre line 42.

Figure 5A:
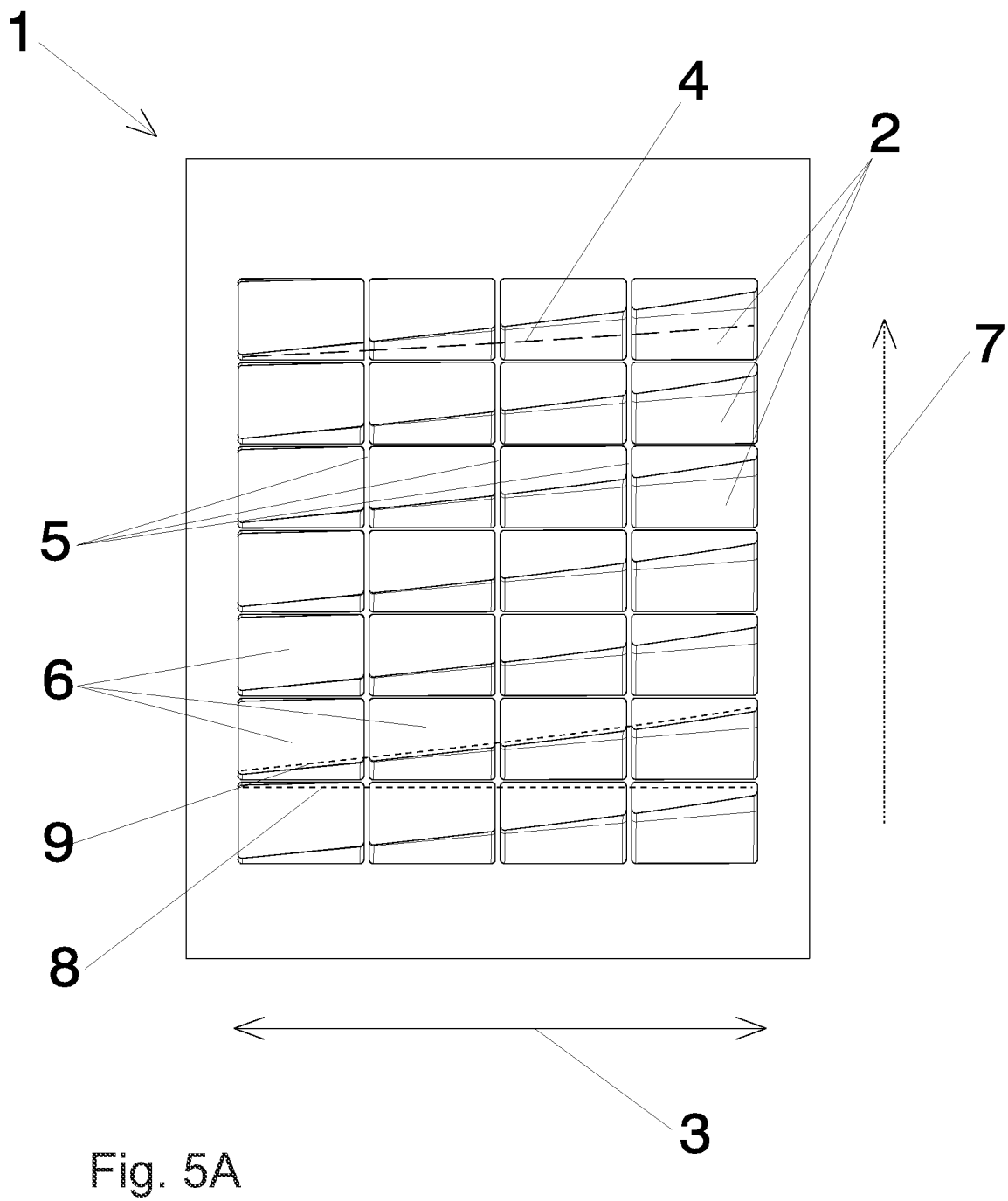
FIG. 5A shows a preferred embodiment of the cascade element according to the invention from inside.
Figure 5C:
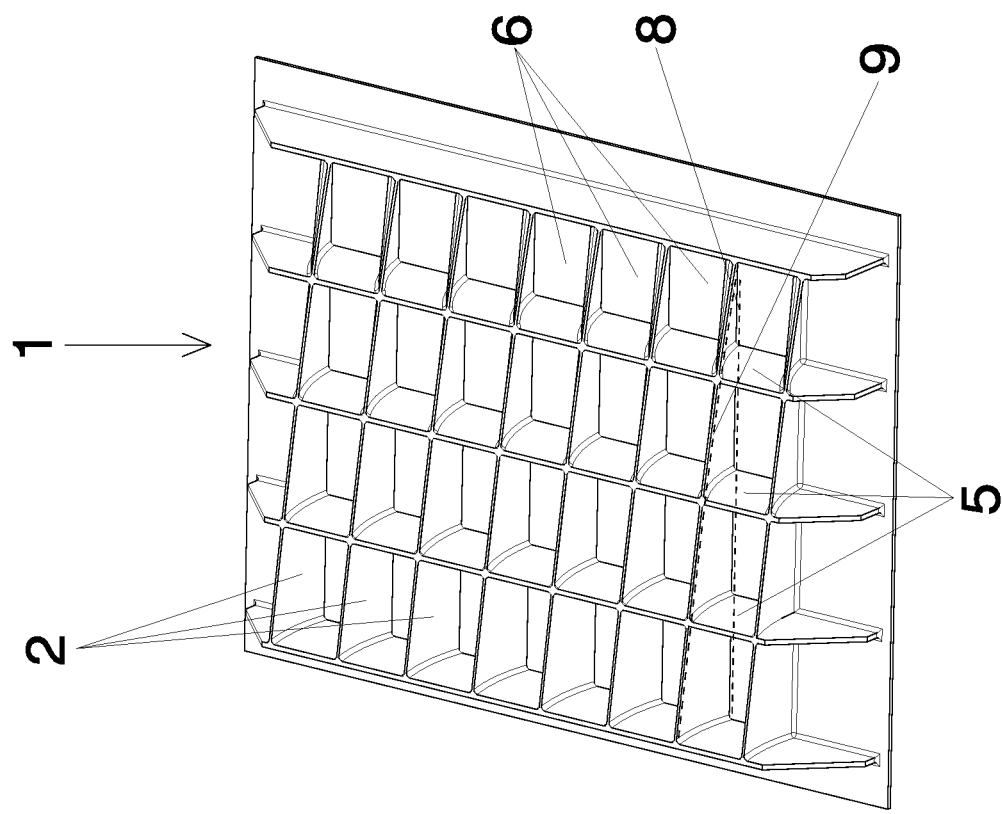
FIG. 5C shows the same cascade element as FIG. 5A in an isometric view from outside.
Figure 5B:
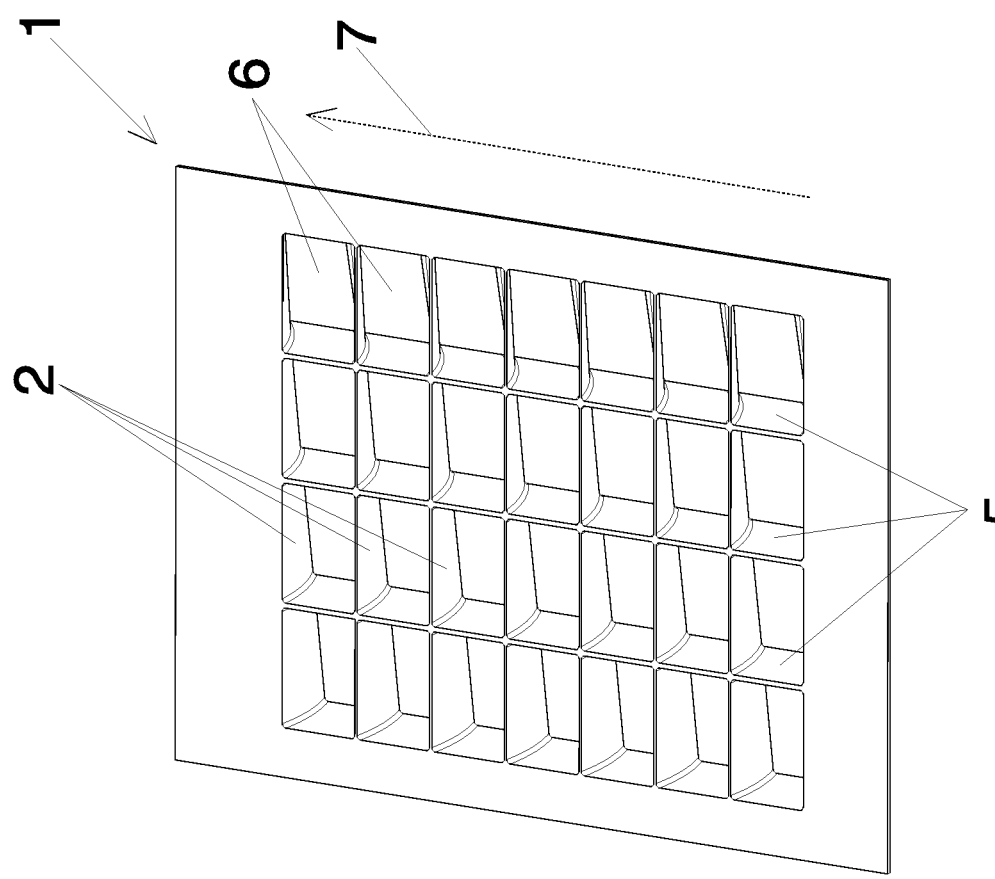
FIG. 5B shows the same cascade element as FIG. 5A in an isometric view from inside.
Figure 5G:
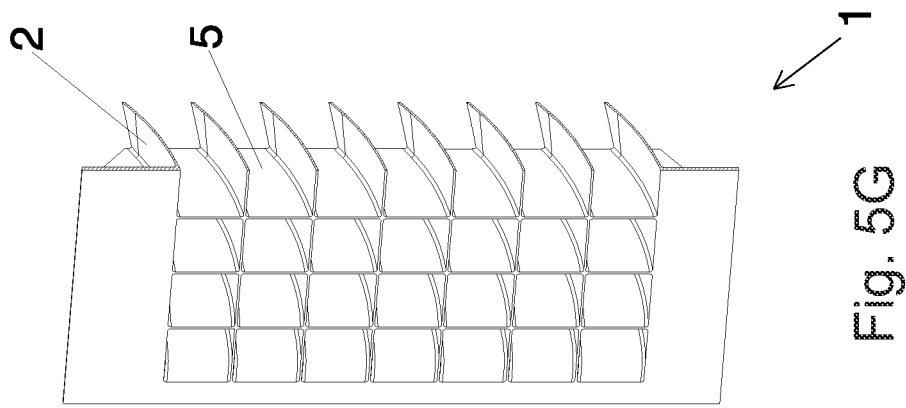
FIG. 5G shows the same cascade element as FIG. 5A in a fourth sectional view.
Figure 5F:
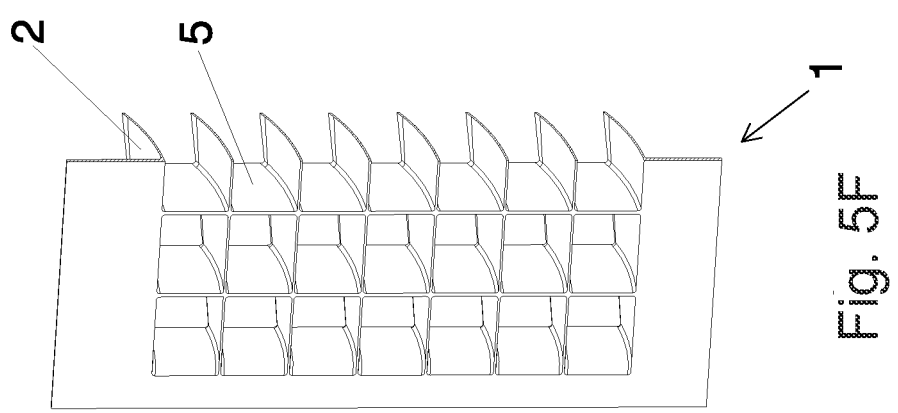
FIG. 5F shows the same cascade element as FIG. 5A in a third sectional view.
Figure 5E:
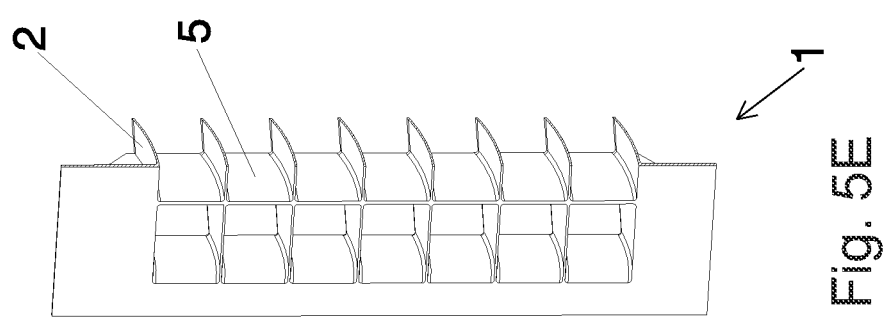
FIG. 5E shows the same cascade element as FIG. 5A in a second sectional view.
Figure 5D:
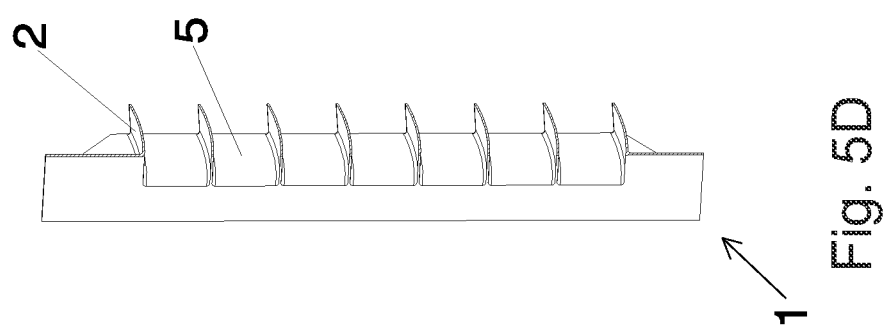
FIG. 5D shows the same cascade element as FIG. 5A in a first sectional view.
Figure 6A:
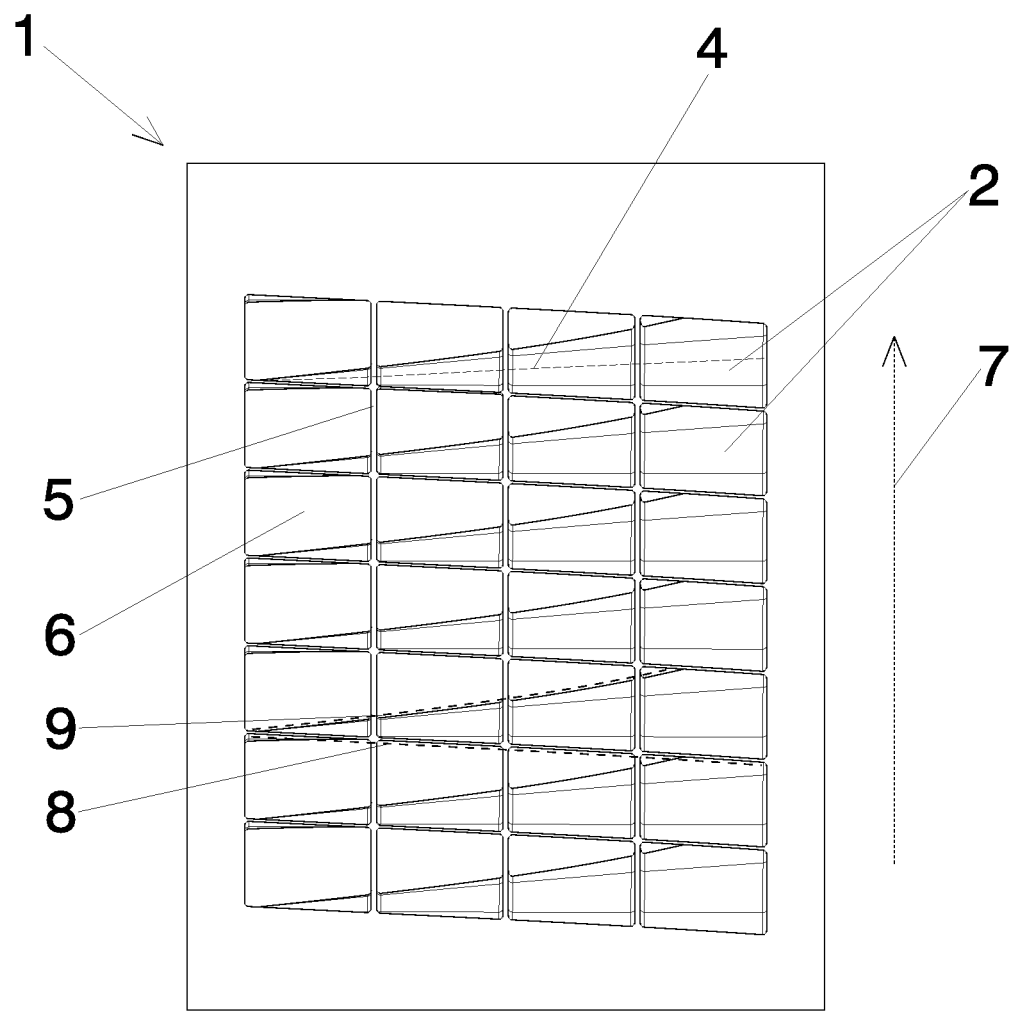
FIG. 6A shows a further preferred embodiment of the cascade element according to the invention from inside.
Figure 6C:
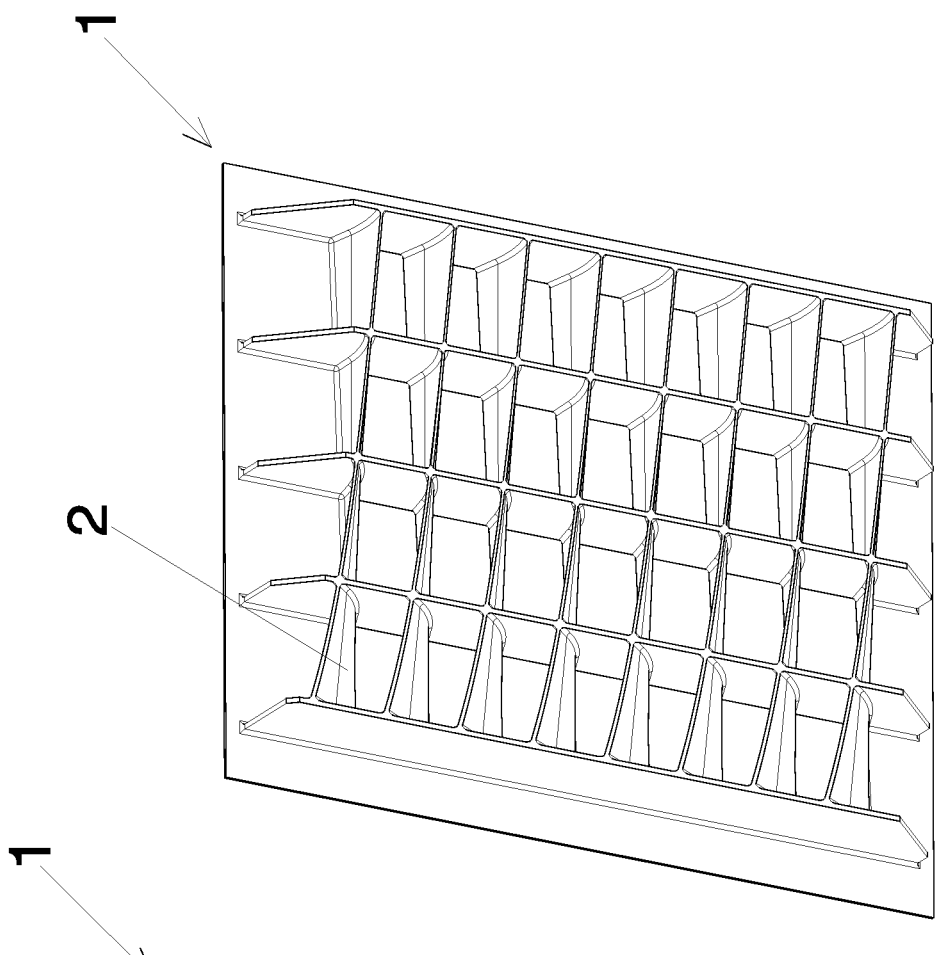
FIG. 6C shows the same cascade element as FIG. 6A in an isometric view from outside.
Figure 6B:
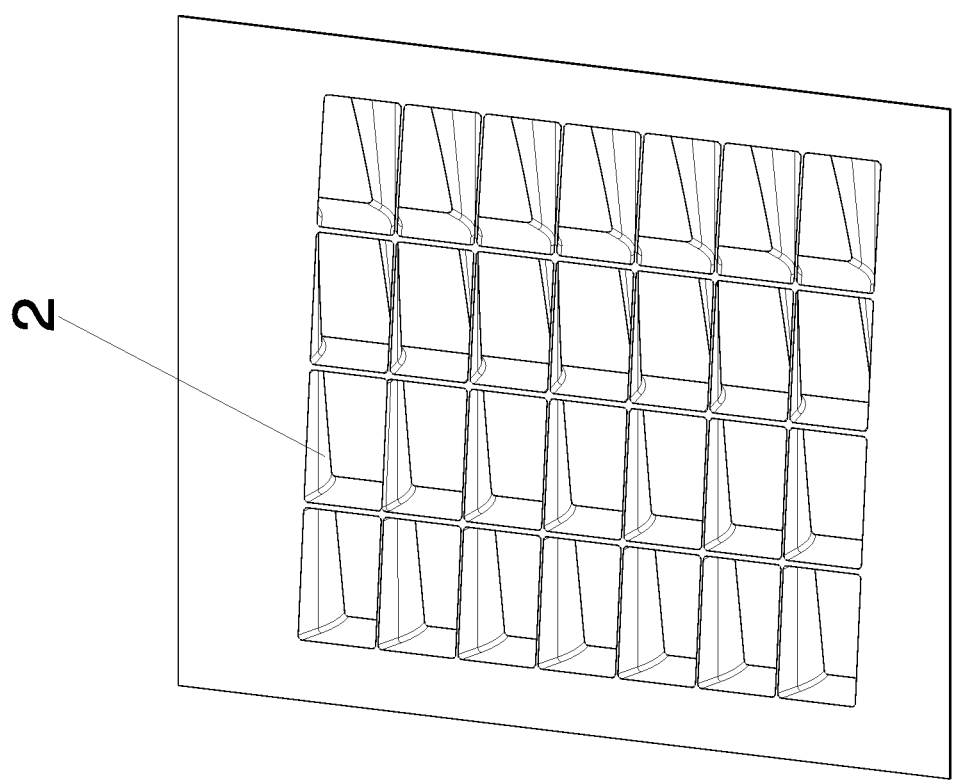
FIG. 6B shows the same cascade element as FIG. 6A in an isometric view from inside.
Figure 6G:
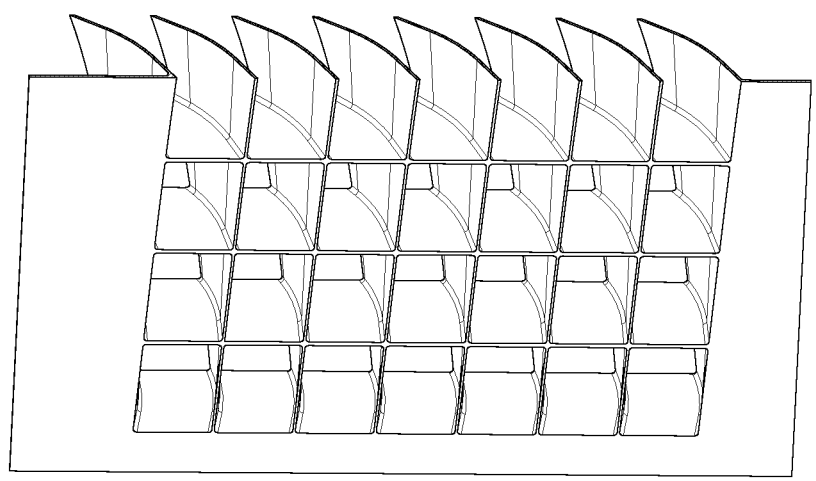
FIG. 6G shows the same cascade element as FIG. 6A in a fourth sectional view.
Figure 6F:
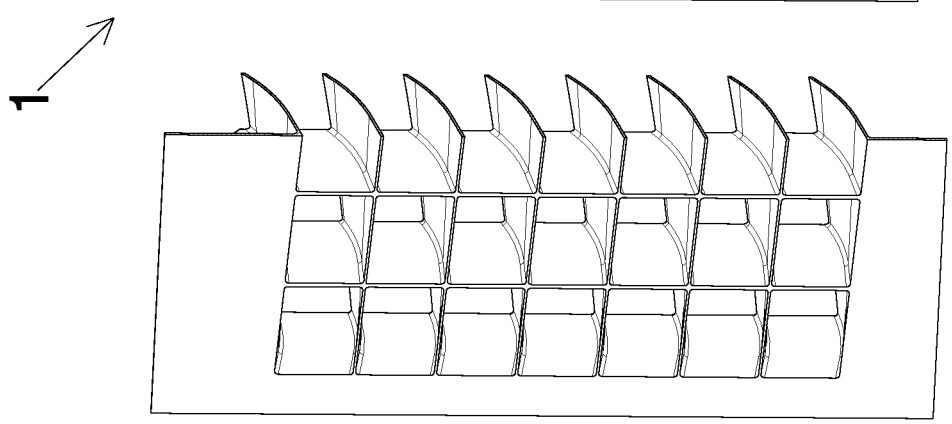
FIG. 6F shows the same cascade element as FIG. 6A in a third sectional view.
Figure 6E:
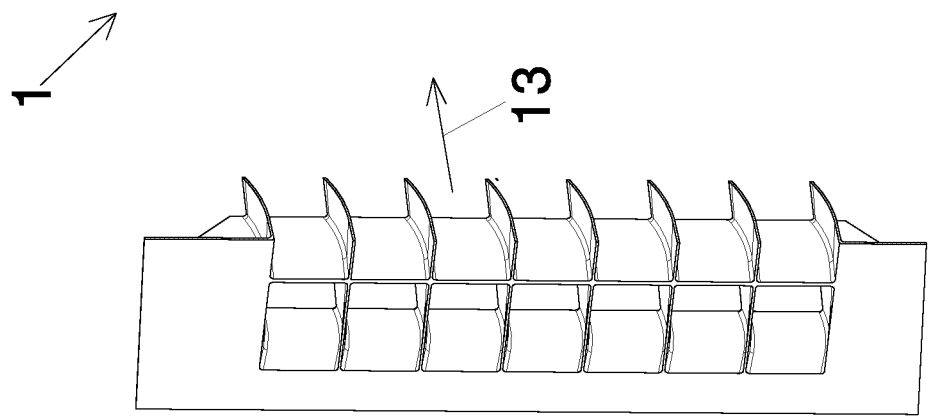
FIG. 6E shows the same cascade element as FIG. 6A in a second sectional view.
Figure 6D:
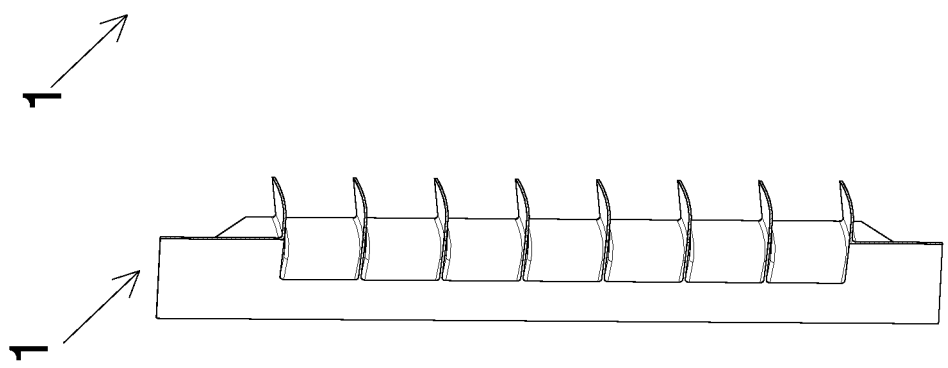
FIG. 6D shows the same cascade element as FIG. 6A in a first sectional view.
Figure 7A:
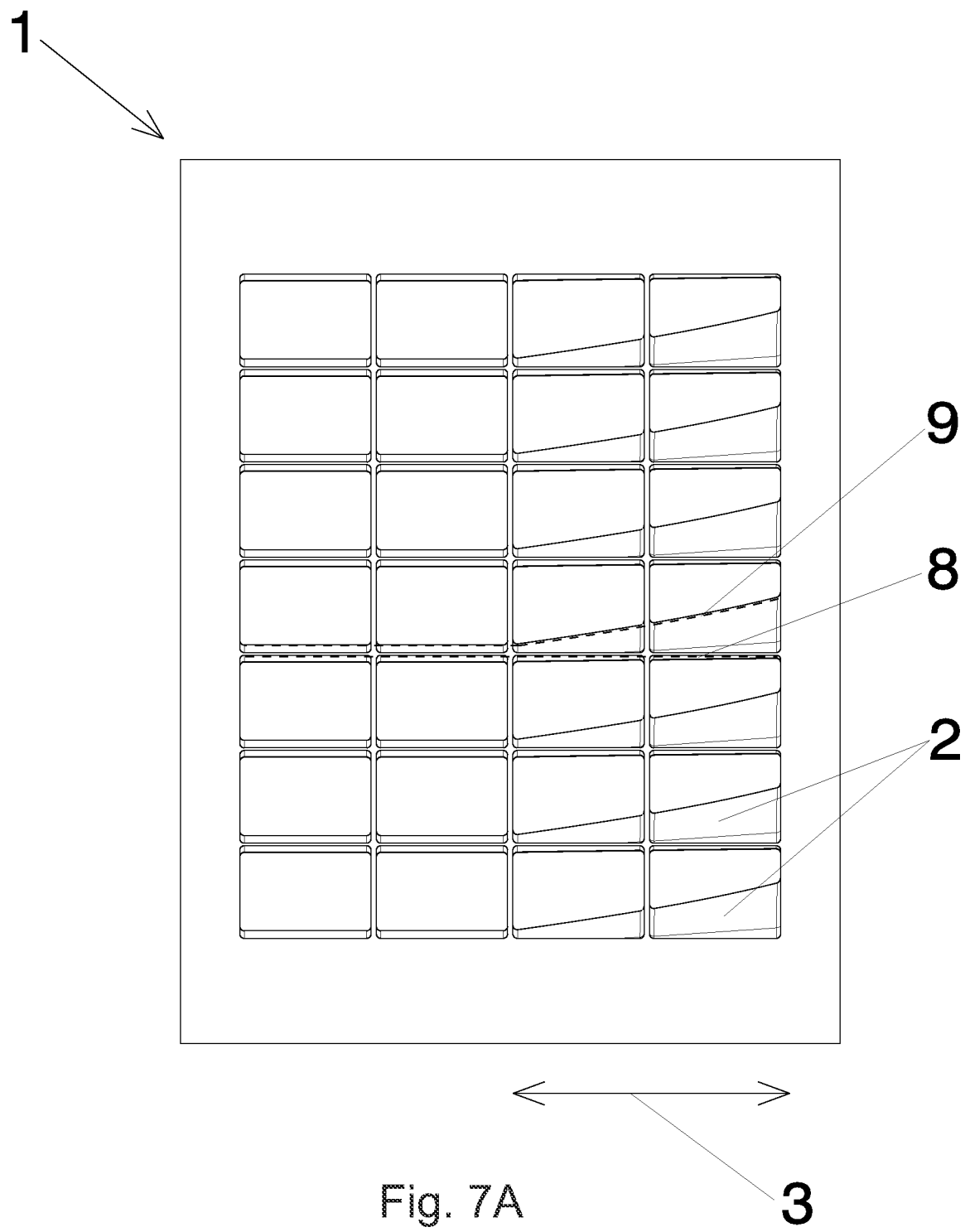
FIG. 7A shows a further preferred embodiment of the cascade element according to the invention from inside.
Figure 7G:
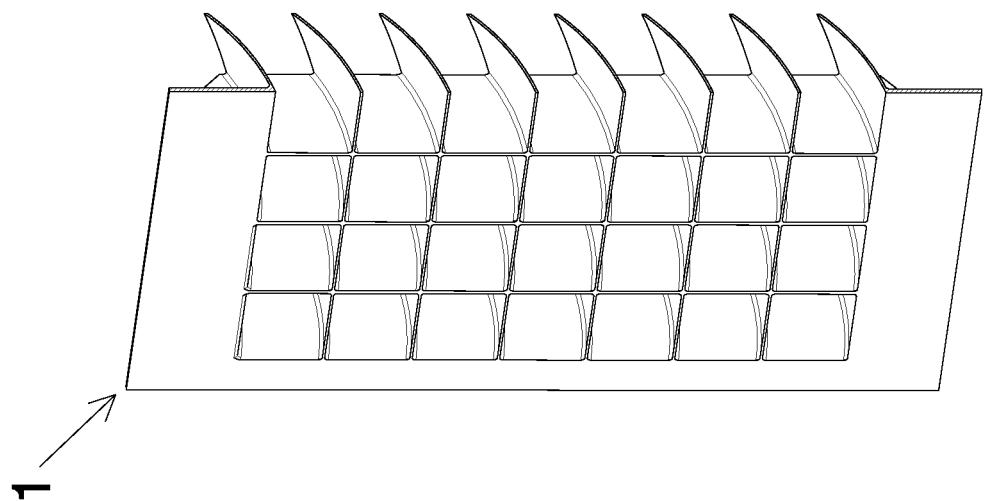
FIG. 7G shows the same cascade element as FIG. 7A in a fourth sectional view.
Figure 7F:
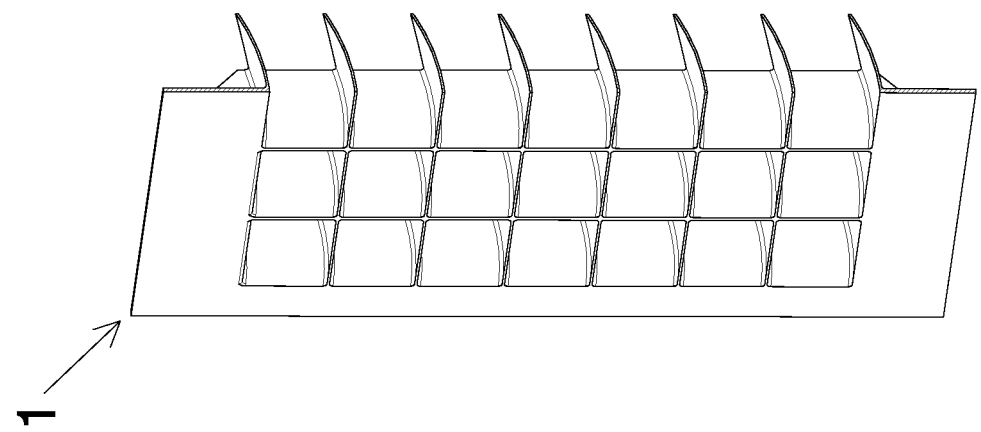
FIG. 7F shows the same cascade element as FIG. 7A in a third sectional view.
Figure 7E:
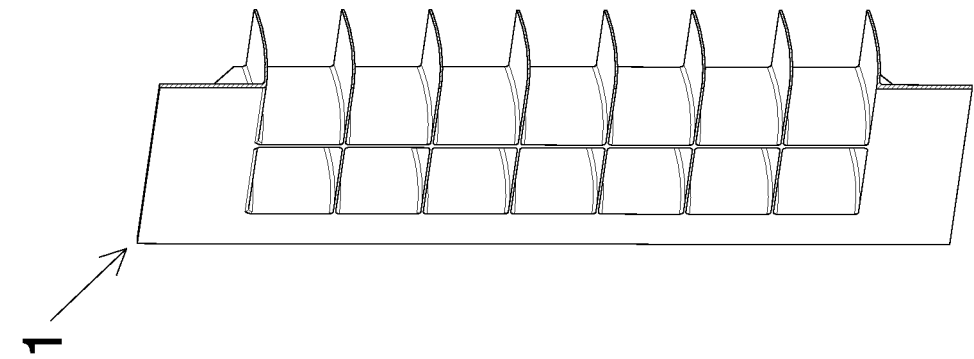
FIG. 7E shows the same cascade element as FIG. 7A in a second sectional view.
Figure 7D:
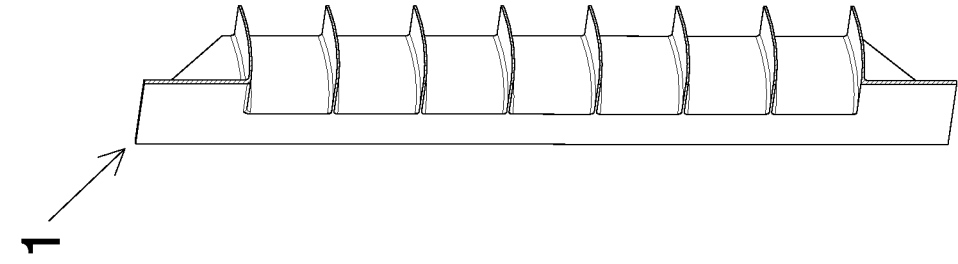
FIG. 7D shows the same cascade element as FIG. 7A in a first sectional view.
Figure 8A:
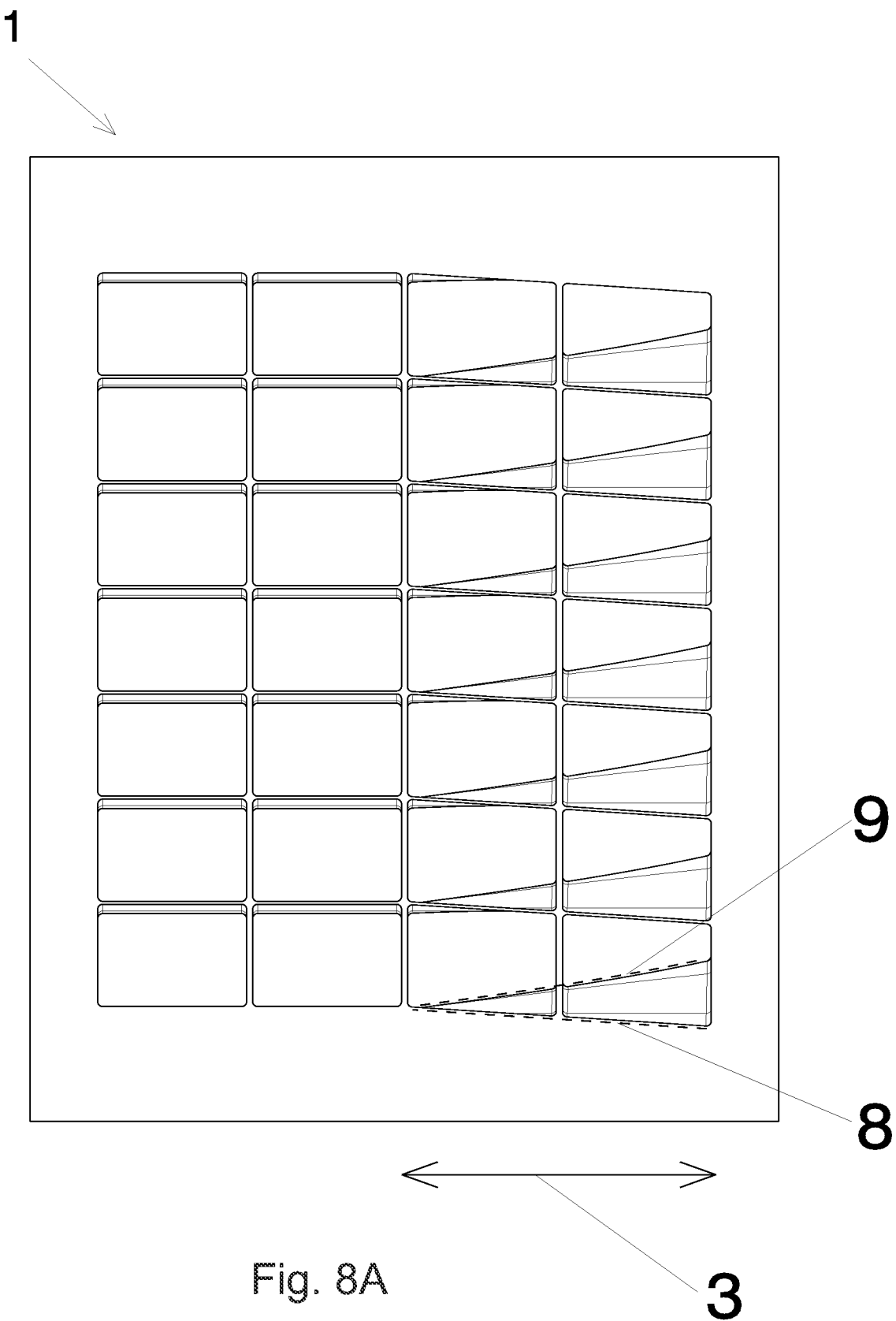
FIG. 8A shows a further preferred embodiment of the cascade element according to the invention from inside.
Figure 8C:
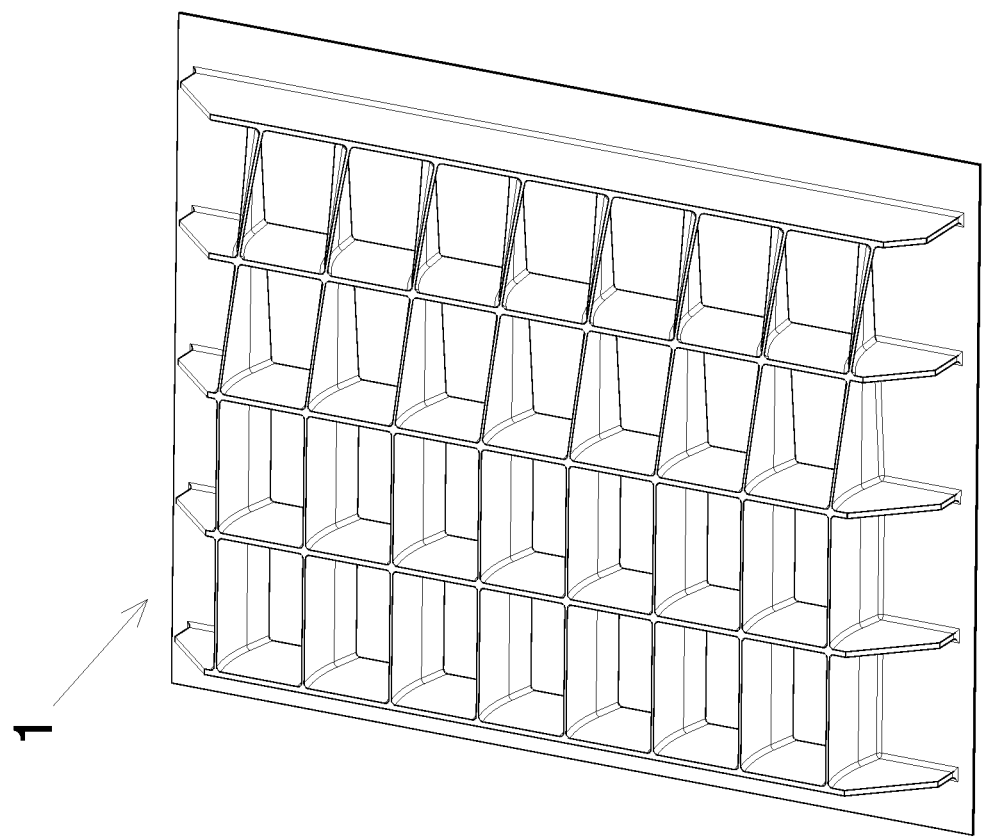
FIG. 8C shows the same cascade element as FIG. 8A in an isometric view from outside.
Figure 8B:
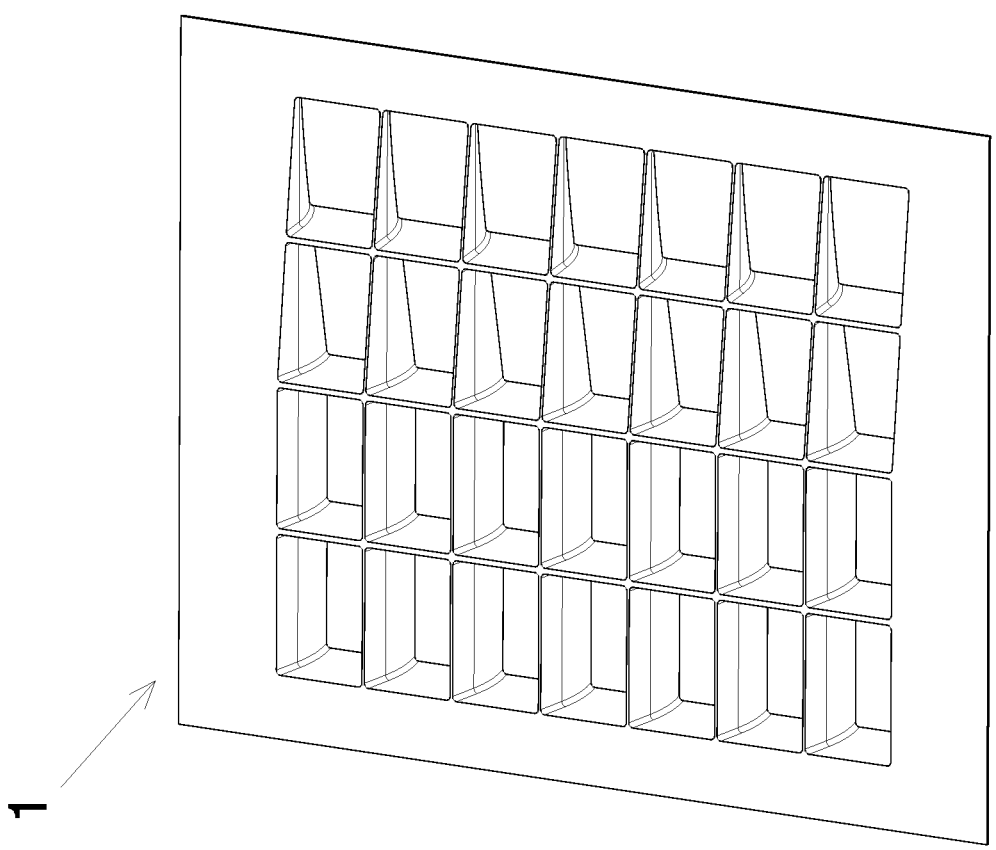
FIG. 8B shows the same cascade element as FIG. 8A in an isometric view from inside.
Figure 8G:
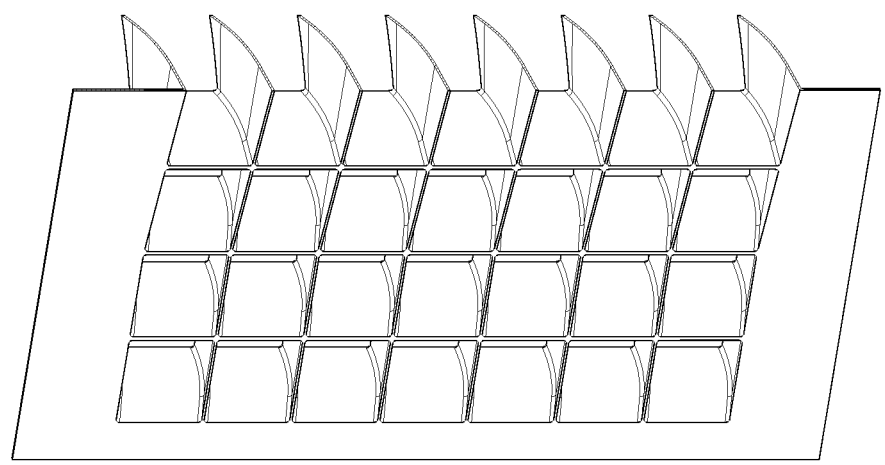
FIG. 8G shows the same cascade element as FIG. 8A in a fourth sectional view.
Figure 8F:
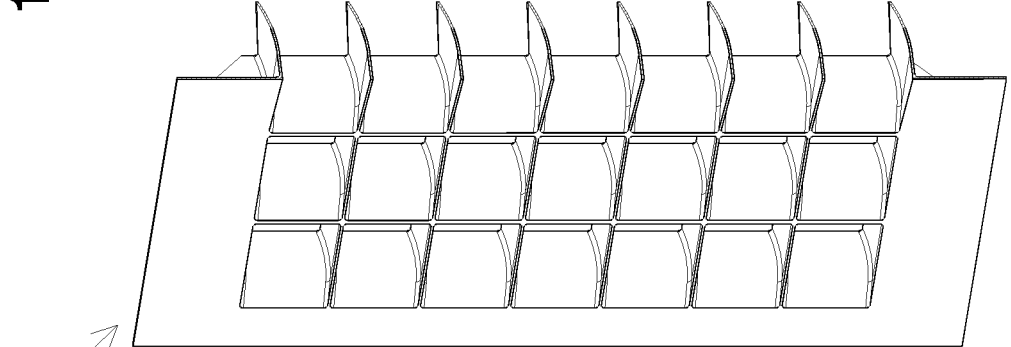
FIG. 8F shows the same cascade element as FIG. 8A in a third sectional view.
Figure 8E:
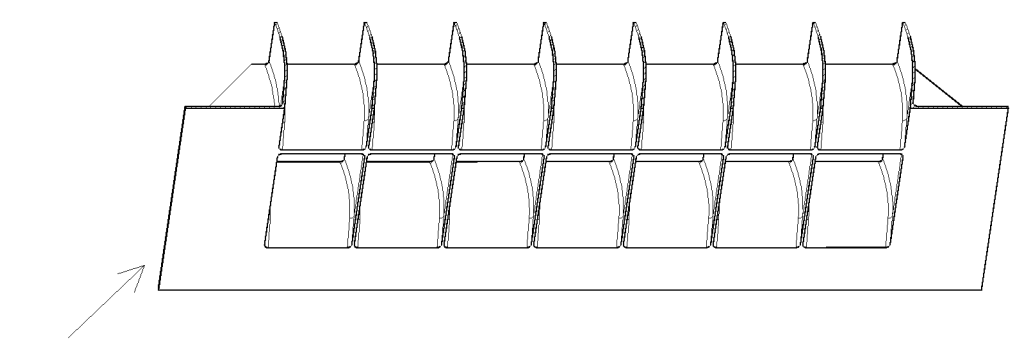
FIG. 8E shows the same cascade element as FIG. 8A in a second sectional view.
Figure 8D:
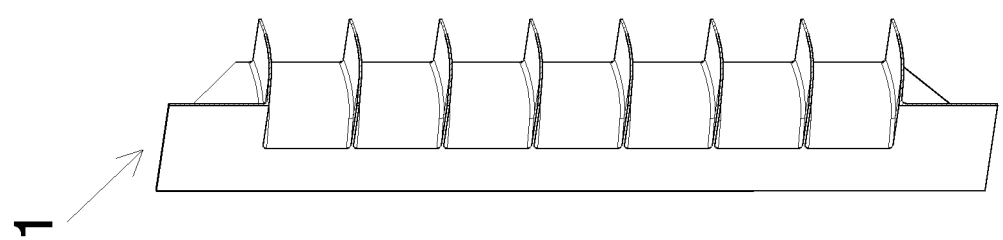
FIG. 8D shows the same cascade element as FIG. 8A in a first sectional view.

FIGS. 5A to 5G show a preferred embodiment of the cascade element 1 according to the invention for a thrust reverser system 22 of an engine 20. FIGS. 5A and 5B show the cascade element 1 from the inside; FIG. 5C shows the cascade element 1 from the outside. The terms "inside" and "outside" in this case relate to the inside or outside in the state of the cascade element 1 when installed as intended in an engine 20. FIGS. 5D to 5G in this case are different sectional views of the cascade element 1. The cascade element 1 comprises a number of adjacently arranged deflecting blades 2 for deflecting an airflow. In the embodiment shown, the cascade element 1 comprises six ("regular") deflecting blades 2 and two deflecting blades 2 (arranged at the edge) and therefore eight deflecting blades 2 in total, wherein of course, different numbers of deflecting blades 2 are also possible. The deflecting blades 2 are twisted about their respective longitudinal axis 4 (of which one is indicated dashed) along a twisting longitudinal section 3, which in this embodiment extends along the entire length of the deflecting blades 2. The deflecting blades 2 are connected to one another by a plurality of supporting walls 5. Five supporting walls 5 are provided in this embodiment, wherein two outer supporting walls 5 in each case form outer walls at the same time. Of course, other numbers of supporting walls 5 can also be provided. Two adjacent deflecting blades 2 and two adjacent supporting walls form a fluid flow deflection channel 6 in each case.

The deflecting blades 2 can in each case be curved with respect to an axis, which is defined by a spacing direction 7 of the number of deflecting blades 2 from one another, to adapt to a lateral surface or a circumference (cf. outer engine nacelle structure 24 in FIG. 1) of an engine 20. This curvature is not illustrated in FIGS. 5A to 8G, but it can be seen in FIG. 1. The deflecting blades 2 comprise a curved cross section. That is to say, the deflecting blades 2 comprise a curvature about their respective longitudinal axis 4. Due to this curvature, the deflection of the airflow is strengthened in terms of a component in the forwards axial direction (i.e. in the direction opposite to the outlet airflow for flight operations).

FIGS. 6A to 6G show a further preferred embodiment of the cascade element 1. This embodiment essentially corresponds to that of FIGS. 5A to 5G, however the twist is realized differently. Whilst in the embodiment of FIGS. 5A to 5G, a bottom (i.e. innermost) longitudinal line 8 respectively of a deflecting blade 2 substantially continues to run along a circumference of the engine 20, a top longitudinal line 9 (i.e. a longitudinal line lying on the outer side of the engine 20) is inclined with respect to a circumferentially running line of the engine 20. In the embodiment of FIGS. 6A to 6G, the bottom longitudinal line 8 respectively of the deflecting blade 2 is inclined in the one direction with respect to a circumferential line of the engine 20 and a top longitudinal line 9 respectively of the deflecting blades 2 is inclined in the other direction. The deflecting blades 2 of the embodiment of FIGS. 6A to 6G comprise a stronger twist than those of FIGS. 5A to 5G, wherein in both cases, the twisting longitudinal section 3 extends over the entire longitudinal extent of the deflecting blades 2. The direction of downward extent 13 is drawn in FIG. 6E.

The embodiment shown in FIGS. 7A to 7G essentially corresponds to that shown in FIGS. 5A to 5G. In contrast to the latter however, the twisting longitudinal section 3 only extends over approximately half of the longitudinal extent of each deflecting blade 2. That is to say the deflecting blades 2 comprise a twist only over a part region of their length. That is to say the longitudinal lines 8, 9 of the deflecting blades are parallel to one another in a first section (on the left side in FIGS. 7A, 7B) and comprise a twist and are skew to one another in a section adjacent thereto (on the right side in FIGS. 7A, 7B). Thus, the deflection of the air can be controlled more precisely. Of course, different deflecting blades 2 of a cascade element 1 may comprise different twists (for example different twist angles) and different twisting longitudinal sections 3. Also, only one deflecting blade 2 or only a portion of the deflecting blades 2 may comprise a (possibly different) twist.

The embodiment shown in FIGS. 8A to 8G differs from the embodiment shown in FIGS. 7A to 7G due to the shape of the bottom longitudinal line 8 and top longitudinal line 9, in a manner comparable to the difference between the embodiments of FIGS. 5A to 5G and 6A to 6G. In this case, the lines 8, 9 in turn run parallel in a first section and at an angle in a second section.

Figure 9:
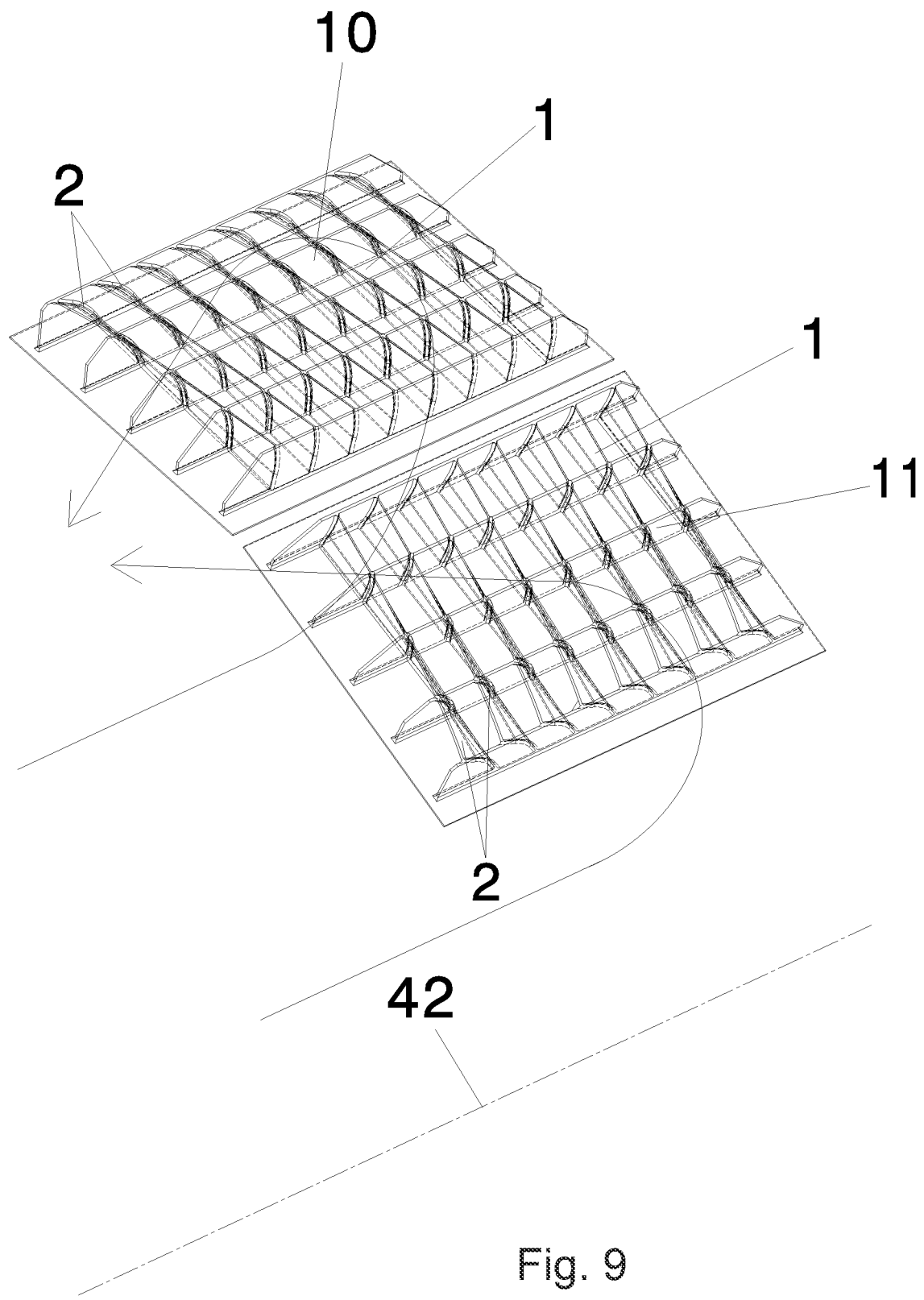
FIG. 9 shows an arrangement of two substantially mirrored cascade elements.

FIG. 9 shows an arrangement of two cascade elements 1, namely a first cascade element 10 and a second cascade element 11. An arrangement of this type may for example be provided in the thrust reverser system 22 of an engine 20. The first cascade element 10 and the second cascade element 11 are arranged circumferentially on an engine 20 in particular, i.e. arranged adjacently in the radial direction with respect to an engine axis 42. The deflecting blades 2 of the first cascade element 10 are twisted about a respective longitudinal axis of this deflecting blade 2 in a first angular direction and the deflecting blades 2 of the second cascade element 11 are twisted about a respective longitudinal axis in a second angular direction, which is opposite to the first angular direction. As a result, a thrust reversal airflow can be bundled, as indicated by the two arrows.

Figure 10:
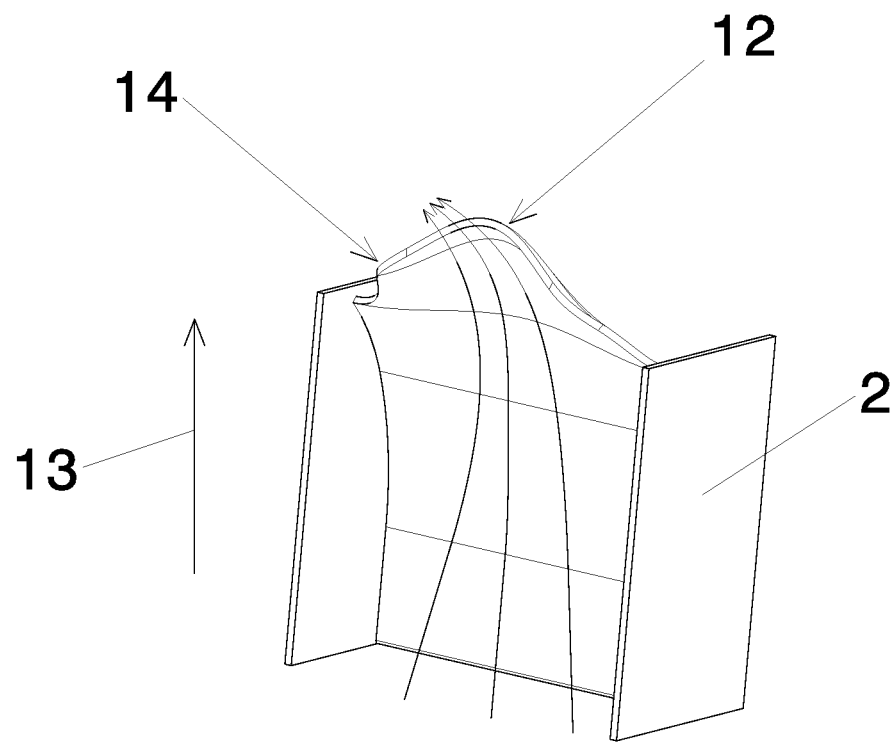
FIG. 10 shows a deflecting blade with a bulge.

FIG. 10 shows an embodiment of a deflecting blade 2, which comprises a bulge 12 on an edge 14 delimiting the deflecting blade 2 in the direction of downward extent 13. Therefore, the shape of the edge 14 deviates from a straight line or, in the twisting longitudinal section 3, from a helix. The deflecting blade 2 is designed as a partial shell in the region of the bulge 12. The arrows indicate a deflection and bundling of the airflow. In this case, the deflecting blade 2 is designed in such a manner that a fluid flow flowing past the deflecting blade 2 is deflected in the direction of a central line of the bulge 12. As a result, the air flowing through the fluid flow deflection channel 6 can be deflected or bundled more strongly in the direction of the longitudinal axis 4 of the cascade element 1. Particularly in the state when installed as intended in an engine 20 of an aircraft, the deflection of the airflow counter to the direction of flight can as a result be strengthened, as a result of which an increase of the braking effect can be achieved.

Figure 11:
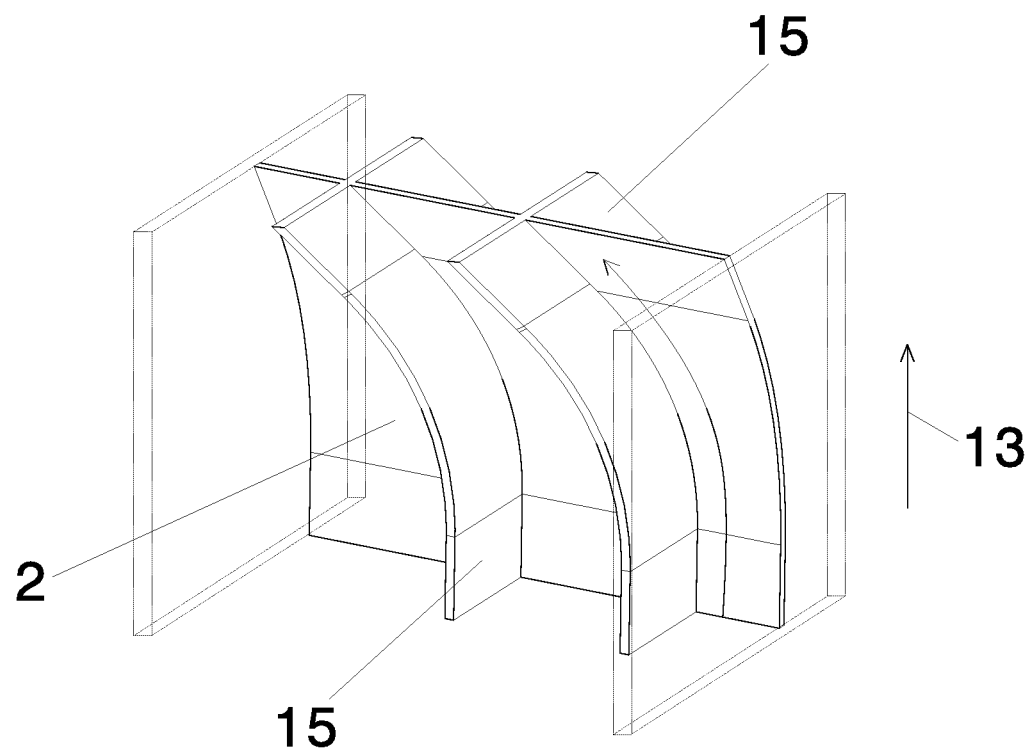
FIG. 11 shows a deflecting blade with guiding ribs.

FIG. 11 shows a further embodiment of a deflecting blade 2. Guiding ribs 15 are provided on the deflecting blade 2, which run substantially in the direction of downward extent 13 of the deflecting blade 2. In this embodiment, the guiding ribs 15 are provided on both sides of the deflecting blade 2. Of course, these may also be provided only on one side. In this embodiment, two guiding ribs are provided per side, of course different numbers of guiding ribs 15 are also possible.

Figure 12:
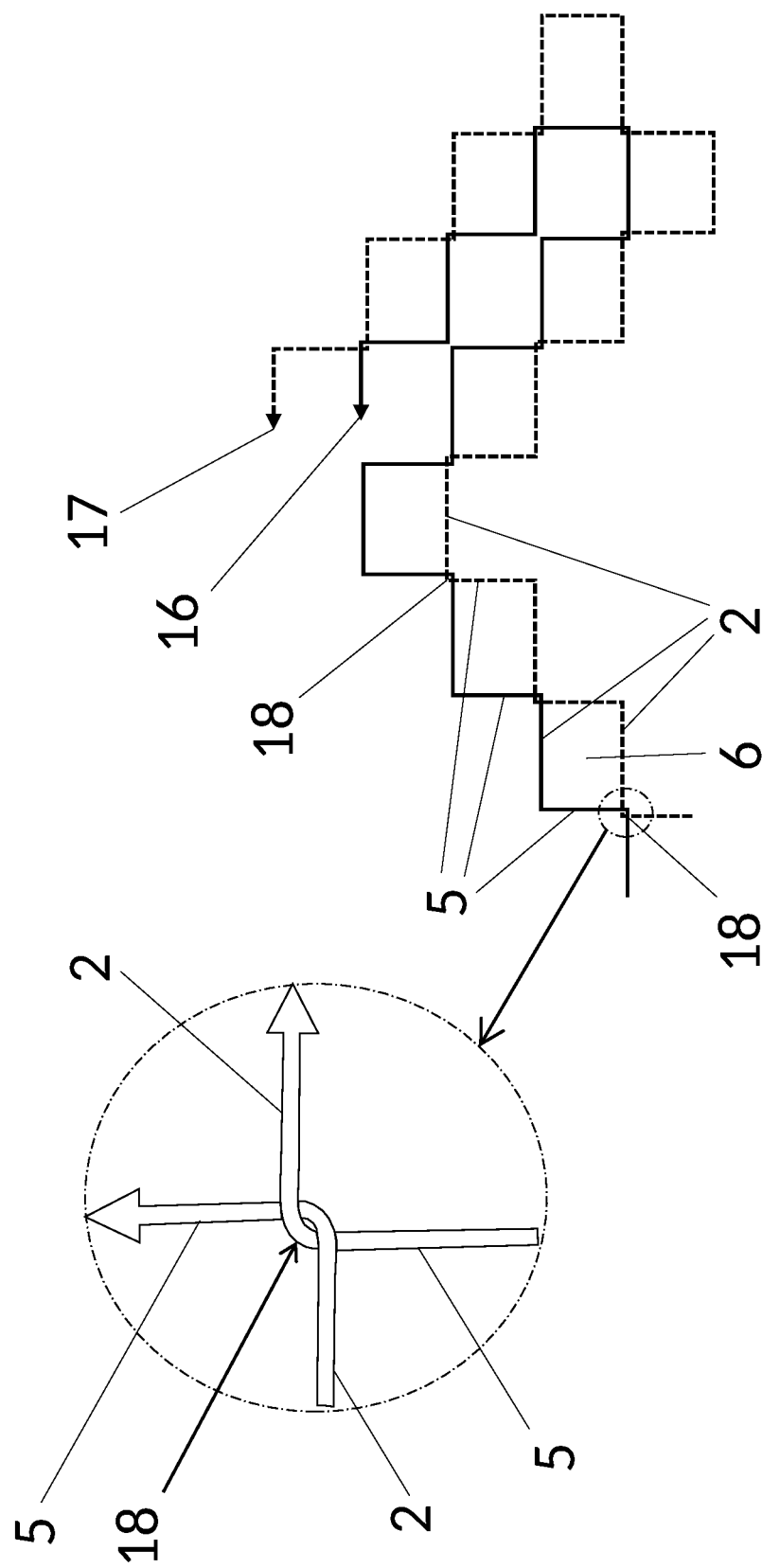
FIG. 12 shows a variant of the method for additive production of the cascade element particularly with interwoven reinforcing fibres.

FIG. 12 shows the additive production of a number of adjacently arranged deflecting blades 2 and of supporting walls 5, wherein in each case, two adjacent deflecting blades 2 and two adjacent supporting walls 5 form a fluid flow deflection channel 6. In this case, the additive production takes place using a first print head 16 and a second print head 17 (stylized as arrows), wherein at least one supporting wall 5 and one deflecting blade 2, which delimit a certain fluid flow deflection channel 6, are produced using the first print head 16, and at least one further supporting wall 5 and one further deflecting blade 2, which delimit the certain fluid flow deflection channel 6, are produced using the second print head 17, wherein fibres used for additive production from the first print head 16 and from the second print head 17 are criss-crossed in an interwoven manner at least at one corner 18 of the certain fluid flow deflection channel 6. In particular, further fluid flow deflection channels 6 are also produced additively in the same manner. Advantageously, in a first pass, one layer in each case is applied by the first and by the second print head 16, 17. In at least one second pass, in each case one further layer is applied (particularly according to a new pattern), so that at least one, preferably each, deflecting blade 2 and at least one, preferably each, supporting wall 5 contains layers from the first and from the second print head 16, 17. That is to say, for the second layer, the print heads 16, 17 are preferably guided in a transposed manner, i.e. the first print head 16 prints a second layer onto a first layer produced by the second print head 17 and vice versa. As a result, the stability of the cascade element 1 can be improved.

The invention claimed is:

1. A cascade element for a thrust reverser system of an engine, comprising:
   a number of adjacently arranged deflecting blades for deflecting an airflow,
   wherein at least one of the deflecting blades is twisted about its longitudinal axis at least along a twisting longitudinal section, and
   wherein at least one deflecting blade comprises a bulge on an edge delimiting the deflecting blade in a direction of downward extent, so that a shape of the edge deviates from a straight line or, in the twisting longitudinal section, from a helix.

2. The cascade element according to claim 1, wherein the adjacently arranged deflecting blades are connected to one another by at least two supporting walls, wherein in each case, two adjacent deflecting blades and two supporting walls form a fluid flow deflection channel.

3. The cascade element according to claim 1, wherein the deflecting blades are curved with respect to an axis, which is defined by a spacing direction of the number of deflecting blades from one another, to adapt to a lateral surface of an engine nacelle.

4. The cascade element according to claim 3, wherein at least one deflecting blade comprises a wall thickness which changes in a direction of downward extent.

5. The cascade element according to claim 4, wherein the wall thickness decreases in a direction of an airflow discharge direction of a thrust reverser system or the wall thickness decreases from a longitudinal line in both directions of the downward extent.

6. The cascade element according to claim 1, wherein at least one deflecting blade comprises a curved cross section.

7. The cascade element according to claim 1, wherein the at least one deflecting blade is designed to be concave in a region of the bulge.

8. The cascade element according to claim 1, wherein the deflecting blade is designed in such a manner that a fluid flow flowing past the deflecting blade is deflected and/or bundled in a direction of a central line of the bulge.

9. The cascade element according to claim 1, wherein at least one guiding rib is provided on at least one deflecting blade.

10. The cascade element according to claim 1, wherein the engine is a jet engine.

11. An engine having a thrust reverser system, wherein the thrust reverser system comprises at least one cascade element, the cascade element comprising:
   a number of adjacently arranged deflecting blades for deflecting an airflow,
   wherein at least one of the deflecting blades is twisted about its longitudinal axis at least along a twisting longitudinal section, and
   wherein at least one deflecting blade comprises a bulge on an edge delimiting the deflecting blade in a direction of downward extent, so that a shape of the edge deviates from a straight line or, in the twisting longitudinal section, from a helix.

12. The engine according to claim 11, wherein the at least one cascade element comprises at least one first cascade element and one second cascade element, wherein the first and the second cascade element in a circumferential direction with respect to an engine axis are arranged adjacently, wherein at least one of the deflecting blades of the first cascade element is twisted in a first angular direction about a longitudinal axis of the same deflecting blade at least along the twisting longitudinal section, and at least one of the deflecting blades of the second cascade element is twisted in a second angular direction, which is opposite to the first angular direction, about the longitudinal axis of the same deflecting blade at least along the twisting longitudinal section.

13. A method for producing a cascade element for a thrust reverser system of an engine, comprising:
   additive production of a number of adjacently arranged deflecting blades for deflecting an airflow, wherein at least one of the deflecting blades is constructed with a twist with respect to its longitudinal axis along a twisting longitudinal section, and wherein at least one deflecting blade is constructed with a bulge on an edge delimiting the deflecting blade in a direction of downward extent, so that a shape of the edge deviates from a straight line or, in the twisting longitudinal section, from a helix.

14. The method according to claim 13, wherein the method further comprises:
additive production of at least two supporting walls, using which adjacently arranged deflecting blades are connected to one another, wherein in each case two adjacent deflecting blades and two supporting walls form a fluid flow deflection channel.

15. The method according to claim 14, wherein the additive production of the number of adjacently arranged deflecting blades and the additive production of at least two supporting walls takes place using at least one first print head and one second print head, wherein at least one supporting wall and one deflecting blade, which delimit a certain fluid flow deflection channel, are produced using the first print head, and at least one further supporting wall and one further deflecting blade, which delimit the certain fluid flow deflection channel, are produced using the second print head, wherein fibres used for additive production from the first print head and from the second print head are criss-crossed in an interwoven manner at least at one corner of the certain fluid flow deflection channel.

16. The method according to claim 15, wherein the supporting wall, the deflecting blade, the further supporting wall and the further deflecting blade, which delimit the certain fluid flow deflection channel each comprise two layers, wherein the production of one of the two layers takes place using the first print head and the production of the other of the two layers takes place using the second print head.

17. The method according to claim 13, wherein the engine is a jet engine.

* * * * *